United States Patent
Matsuno

(10) Patent No.: US 10,994,452 B2
(45) Date of Patent: May 4, 2021

(54) POWDER SLUSH MOLDING MACHINE AND POWDER SLUSH MOLDING METHOD

(71) Applicant: NAKATA COATING CO., LTD., Yokohama (JP)

(72) Inventor: Takemi Matsuno, Yokohama (JP)

(73) Assignee: NAKATA COATING CO., LTD., Yokohama (JP)

( * ) Notice: Subject to any disclaimer, the term of this patent is extended or adjusted under 35 U.S.C. 154(b) by 261 days.

(21) Appl. No.: 15/568,798

(22) PCT Filed: Jul. 15, 2016

(86) PCT No.: PCT/JP2016/070935
§ 371 (c)(1),
(2) Date: Oct. 24, 2017

(87) PCT Pub. No.: WO2017/018240
PCT Pub. Date: Feb. 2, 2017

(65) Prior Publication Data
US 2018/0099437 A1    Apr. 12, 2018

(30) Foreign Application Priority Data
Jul. 29, 2015    (JP) .............................. JP2015-149202

(51) Int. Cl.
*B29C 41/18*    (2006.01)
*B29C 41/46*    (2006.01)
(Continued)

(52) U.S. Cl.
CPC .............. *B29C 41/18* (2013.01); *B29C 33/36* (2013.01); *B29C 41/46* (2013.01); *B29C 41/38* (2013.01);
(Continued)

(58) Field of Classification Search
CPC ......... B29C 41/18; B29C 41/46; B29C 41/38; B29C 2035/0822; B29C 33/34; B29K 2105/251
See application file for complete search history.

(56) References Cited

U.S. PATENT DOCUMENTS 4,623,503 A * 11/1986 Anestis ................. B29C 33/046
264/302
2004/0065981 A1 * 4/2004 Grimmer ................ B29C 33/56
264/402
(Continued)

FOREIGN PATENT DOCUMENTS

EP    2130660 A    12/2009
EP    2402136 A    1/2012
(Continued)

OTHER PUBLICATIONS

Extended European Search Report dated Nov. 23, 2018.

*Primary Examiner* — Alison L Hindenlang
*Assistant Examiner* — Debjani Roy
(74) *Attorney, Agent, or Firm* — Yokoi & Co., U.S.A.; Toshiyuki Yokoi

(57) ABSTRACT

There are provided a powder slush molding machine that preheats a mold using the transfer time of the mold and may be reduced in size, and a powder slush molding method using the powder slush molding machine.
There are provided a powder slush molding machine and a powder slush molding method using the powder slush molding machine. The powder slush molding machine includes: a mold heating portion that heats a mold so that the temperature of the mold is set to a value equal to or higher than a predetermined temperature; a powder slush portion that sprays a molding resin, while powdering the molding resin, to mold a sheet-like material having a predetermined thickness on the inner surface of the heated mold; a mold
(Continued)

cooling portion that cools the mold so that the temperature of the mold is equal to or lower than a predetermined temperature; a mold working portion that separates the cooled sheet-like material from the mold; and a transport device that moves the mold between the respective portions. A preheating device for heating the mold is provided at a part of the transport device.

4 Claims, 12 Drawing Sheets

(51) Int. Cl.
  *B29C 33/36* (2006.01)
  *B29C 41/52* (2006.01)
  *B29C 41/38* (2006.01)
  *B29K 105/00* (2006.01)
  *B29C 35/08* (2006.01)
(52) U.S. Cl.
  CPC ...... *B29C 41/52* (2013.01); *B29C 2035/0822* (2013.01); *B29K 2105/251* (2013.01)

(56) References Cited

U.S. PATENT DOCUMENTS

| | | | |
|---|---|---|---|
| 2005/0053690 A1* | 3/2005 | Bond | ............... B29C 41/18 425/435 |
| 2011/0316184 A1* | 12/2011 | Matsuno | ............... B29C 41/365 264/109 |

FOREIGN PATENT DOCUMENTS

| | | | | |
|---|---|---|---|---|
| JP | H 0241216 A | * | 2/1990 | |
| JP | H 02220819 | * | 9/1990 | |
| JP | H03-202329 A | | 9/1991 | |
| JP | H04-191018 A | | 7/1992 | |
| JP | 3272432 B | | 4/2002 | |
| JP | 2008137272 | * | 6/2008 | |
| JP | 4245565 B2 | * | 3/2009 | ............. B29C 41/18 |
| WO | 03/031139 A | | 4/2003 | |
| WO | 2004/080686 A | | 9/2004 | |
| WO | 2016/031531 A | | 3/2016 | |

* cited by examiner

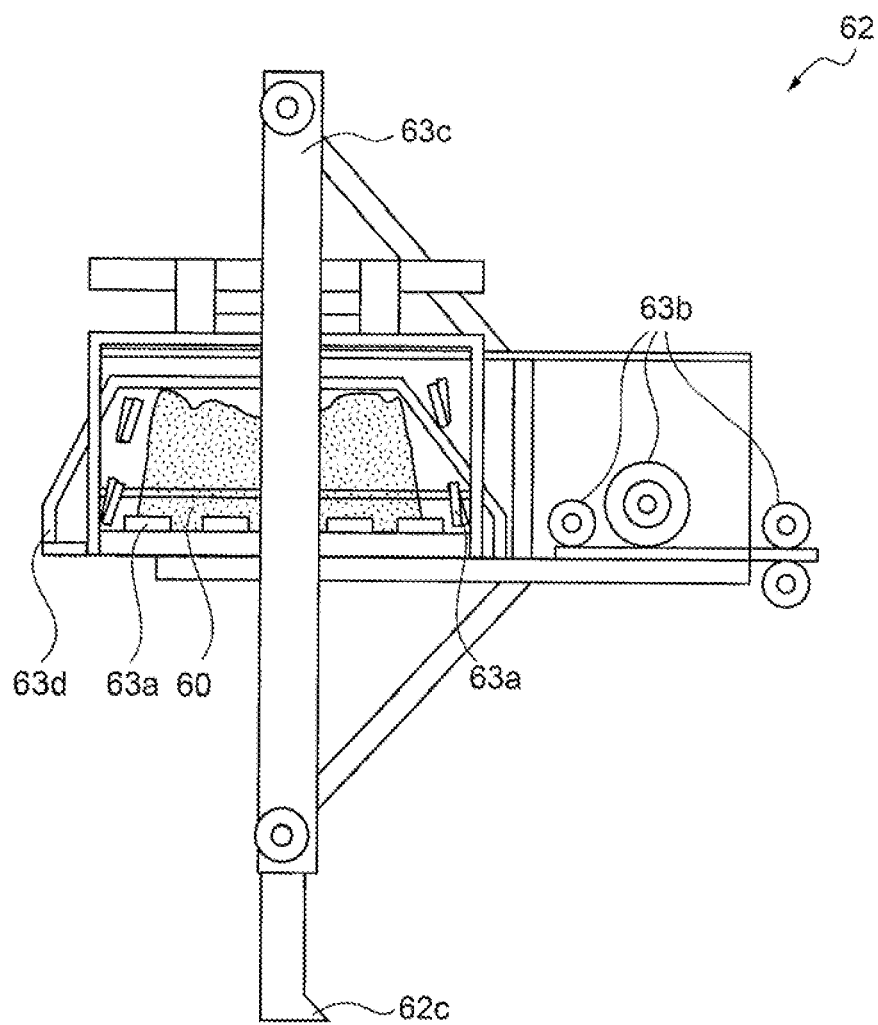

POWDER SLUSH MOLDING MACHINE AND POWDER SLUSH MOLDING METHOD

TECHNICAL FIELD

The present invention relates to a powder slush molding machine and a powder slush molding method. More particularly, the present invention relates to a powder slush molding machine that includes a preheating device for preheating a mold during the transport of the mold in addition to a main heating furnace for the mold, and a powder slush molding method using the powder slush molding machine.

BACKGROUND ART

In the past, a powder slush molding method, which performs the slush molding of powder resin (molding resin) by using a powder slush molding machine including a powder slush portion and a mold cooling portion, has been widely performed to manufacture a sheet-like material, such as an interior material of an automobile that is big and has a complicated shape.

Here, various molds need to be uniformly heated to make the thickness of the interior material, which is made of the molding resin, uniform.

Accordingly, for example, a powder slush molding method is disclosed as a method of forming a leather that includes a temporary heating step and a preheating step controlled to a predetermined temperature and uniformly heats a mold and slowly cools the mold by immersing the mold in water having a predetermined temperature after the use of the mold (for example, see Patent Document 1).

Further, a method of heating a slush mold, which includes using a porous mold as a slush mold, making an opening of a hot air supply duct be in contact with a material inlet of the mold, and pumping hot air into the mold from the duct, is disclosed (for example, see Patent Document 2).

CITATION LIST

Patent Document

Patent Document 1: JP 3-202329 A
Patent Document 2: JP 4-191018 A

SUMMARY OF THE INVENTION

Problem to be Solved by the Invention

However, only the heating of the inner surface of the mold, which is the formation surface of a sheet-like material, using the spray of hot air in one direction by a heating furnace or a post-heating furnace is considered in all of the above-mentioned powder slush molding method and the like. For this reason, there is a problem that the rapid heating and the uniform heating of the entire mold are insufficient. Particularly, there is a problem that the heating of curved or recessed portions of the inner surface is likely to be insufficient with an increase in the size of the mold and a change in the shape of the mold.

Accordingly, a powder slush molding machine, which is provided with not only a heating furnace but also a post-heating furnace, has also been proposed for rapid heating and uniform heating against an increase in the size of the mold and a change in the shape of the mold.

However, in a case in which the post-heating furnace is provided as described above, there is a new problem that the powder slush molding machine is increased in size or time required for steps of manufacturing a sheet-like material is likely to be excessively lengthened.

Accordingly, as a result of keen examination, an inventor of the invention found that a preheating device is provided on a transport device for transferring a mold to entirely or locally preheat not only the outer surface (a non-formation surface of a sheet-like material) of the mold but also the inner surface (a formation surface of a sheet-like material) of the mold so that the entire mold also including the curved portions, the recessed portions, or offset portions of the inner surface may be rapidly and uniformly heated in a main heating furnace.

That is, an object of the invention is to provide a powder slush molding machine in which a mechanism for preheating a mold using the transfer time of a mold is provided on a transport device and the mold is preheated during the transport or the like of the mold so that the entire mold may be rapidly and uniformly heated in a main heating furnace, eventually, a post-heating furnace or the like is omitted to cause the size of the powder slush molding machine to be reduced, and a powder slush molding method using the powder slush molding machine.

Means for Solving Problem

According to the invention, there is provided a powder slush molding machine including: a mold heating portion that heats a mold so that the temperature of the mold is set to a value equal to or higher than a predetermined temperature; a powder slush portion that sprays a molding resin, while powdering the molding resin, to mold a sheet-like material having a predetermined thickness on the inner surface of the heated mold; a mold cooling portion that cools the mold so that the temperature of the mold is equal to or lower than a predetermined temperature; a mold working portion that separates the cooled sheet-like material from the mold; and a transport device that moves the mold between the respective portions. A preheating device for heating the mold is provided at a part of the transport device. Accordingly, the above-mentioned problems may be solved.

That is, according to the invention, the preheating device for heating the mold is provided at a part of the transport device. Accordingly, the entire mold, that is, not only the non-formation surface of the sheet-like material (A surface) but also the formation surface (B surface) may be preheated using the transfer time of the mold. For this reason, the entire mold may be uniformly and rapidly heated to a predetermined temperature during main heating regardless of the shape (a curve, a dent, an offset, and the like) of the inner surface of the mold.

Further, a temperature difference between the inner surface and the outer surface of the mold is reduced by the heating of the preheating device, eventually, the entire mold may be uniformly and rapidly heated in the main heating furnace while the occurrence of the metal fatigue of the mold and the occurrence of a baking phenomenon of a molding resin on the inner surface are effectively suppressed.

Moreover, since the mold may be supplementally heated by the preheating device, main heating to be performed in the main heating furnace may be supplemented, eventually, an increase in the heating capacity, the size, and the like of the main heating furnace may be suppressed. For example, in a case in which the temperature of the mold, which is being transported, that is, does not yet enter the main heating furnace, is raised by only 10° C. by the preheating device, power consumption corresponding to heating capacity (10% or more) required to heat the mold to a predetermined temperature in the main heating furnace may be reduced.

Accordingly, the installation of the post-heating furnace for further curing the sheet-like material, and the like, which have been performed in the past, may be substantially omitted. Therefore, according to the invention, since being reduced in size as much as that, a powder slush molding machine, which is reduced in size and saves a space as a whole, may be provided.

Further, according to the powder slush molding machine of the invention, it is preferable that the preheating device includes a far-infrared heating heater.

Since the preheating device includes the far-infrared heating heater, for example, a ceramic heater as described above, heat rays are applied into the mold from an arbitrary place of at least the outer surface of the mold. Accordingly, the entire mold may be more uniformly and rapidly heated from both surfaces (the A surface and the B surface) regardless of the shape of the inner surface of the mold.

Furthermore, even in a case in which a plurality of far-infrared heating heaters are provided, not only the mold may be heated to a predetermined temperature in a short time by far-infrared rays but also a space is saved with a relatively small weight. Accordingly, even though the far-infrared heating heater is mounted on a part of the transport device, the transport device, the transport device may be smoothly transferred at a high speed.

Moreover, since a plurality of far-infrared heating heaters may be provided, the amount of generated heat is easily and intensively adjusted only at a portion, which is difficult to be heated to a predetermined temperature, in comparison with a portion that is difficult to be heated. As a result, the mold may be made to be in a uniform heated state (temperature profile) as a whole.

Further, according to the powder slush molding machine of the invention, it is preferable that the preheating device includes a cover member including an opening downward and receives the mold through the opening.

That is, since the preheating device includes a substantially bowl-shaped cover member (heat-insulating gripping member) opening downward as described above, the preheating device may reliably grip the periphery of the mold and effectively prevent the radiation of heat from the preheated mold while covering the mold from above.

Furthermore, according to the powder slush molding machine of the invention, it is preferable that the transport device includes a synchronization mechanism switching on the preheating device to preheat the mold at the same time as the gripping of the mold.

Since the mold is preheated in synchronization with an operation for gripping the mold as described above, the transfer time of the mold may be more effectively used.

Further, according to the powder slush molding machine of the invention, it is preferable that the powder slush portion and the mold cooling portion are integrated with each other, and an exchange device, which is capable of exchanging the position of a powder box of the powder slush portion with the position of a cooling device (hereinafter, also referred to as a cooling booth) of the mold cooling portion, is provided between the powder slush portion and the mold cooling portion.

That is, when the mold is to be cooled after the sheet-like material is molded in the powder slush portion, the powder box having been subjected to powder slush is moved to the box replacement position from the powder slush portion and the cooling device provided in the mold cooling portion is moved to a position directly below the rotating device of the powder slush portion and showers cooling water or sprays cooling mist to the outer surface of the mold in a state in which the inner surface of the mold is exposed to the outside. Accordingly, the mold may be rapidly cooled.

Therefore, since the powder slush portion and the mold cooling portion are integrated with each other as described above, the powder slush molding machine may be reduced in size as a whole.

Further, another aspect of the invention provides a powder slush molding method using a powder slush molding machine. The powder slush molding machine includes: a mold heating portion that heats a mold so that the temperature of the mold is set to a value equal to or higher than a predetermined temperature; a powder slush portion that sprays a molding resin, while powdering the molding resin, to mold a sheet-like material having a predetermined thickness on the inner surface of the heated mold; a mold cooling portion that cools the mold so that the temperature of the mold is equal to or lower than a predetermined temperature; a mold working portion that separates the cooled sheet-like material from the mold; and a transport device that moves the mold between the respective portions. A preheating device for heating at least the outer surface of the mold is provided at a part of the transport device.

Furthermore, the powder slush molding method includes: a step of gripping the mold and transferring the mold to the mold heating portion from the mold working portion by the transport device; a step of heating the mold in the mold heating portion so that the temperature of the mold is set to a value equal to or higher than a predetermined temperature; a step of spraying the molding resin, while powdering the molding resin, to mold a sheet-like material having a predetermined thickness on the inner surface of the heated mold after gripping the heated mold and transferring the heated mold to the powder slush portion from the mold heating portion by the transport device; a step of cooling the mold; and a step of separating the cooled sheet-like material from the mold. The mold is heated by the preheating device, which is provided at a part of the transport device, during the step of gripping the mold and transferring the mold to the mold heating portion from the mold working portion by the transport device.

That is, according to the powder slush molding method of the invention, the outer surface and the inner surface of the mold, that is, the formation surface of the sheet-like material may be preheated using the transfer time of the mold. Accordingly, the entire mold may be uniformly and rapidly heated to a predetermined temperature during main heating regardless of the shape of the inner surface of the mold.

Particularly, since the mold is heated by a plurality of steps including the preheating step, the entire mold may be uniformly and rapidly heated regardless of the shape of the inner surface of the mold while the occurrence of metal fatigue and the occurrence of a baking phenomenon of a molding resin on the inner surface are effectively suppressed.

Further, according to the powder slush molding method of the invention, since a post-heating furnace for further curing a sheet material molded once may be substantially omitted and a predetermined preheating device is provided, a heating furnace may be reduced in size. Accordingly, since being reduced in size as much as that, a powder slush molding machine, which is reduced in size and saves a space as a whole, may be provided.

More specifically, since a post-heating furnace and the like for further curing a sheet material molded once may be substantially omitted, a powder slush molding method using a powder slush molding machine, which is reduced in size as much as that, may be provided.

Furthermore, according to the powder slush molding method of the invention, it is preferable that, when transferring the mold (referred to as a first mold for distinguishment), the transport device grips a mold (referred to as a second mold for distinguishment) different from the mold below the transport device and transports the mold at the same time.

Since a plurality of molds (the first mold and the second mold) are simultaneously transported by one transport device as described above, a moving distance is shortened or the operationality of predetermined processing is improved. Accordingly, molding time per sheet material (hereinafter, referred to as takt time or cycle time) may be further shortened.

In addition, since the first and second molds or any one of the molds may be preheated while the first mold and the second mold are simultaneously transported by the preheating device provided in the transport device, takt time may be further shortened or the powder slush molding machine may be further reduced in size.

Further, according to the powder slush molding method of the invention, the powder slush portion and the mold cooling portion are integrated with each other. Accordingly, it is preferable that, when the mold is to be cooled, a powder box having been subjected to the powder slush is moved to a box replacement position from the powder slush portion and a cooling device provided in the mold cooling portion is moved to a position directly below a rotating device of the powder slush portion, is engaged with a frame member gripping the mold, and showers cooling water or sprays cooling mist to the outer surface of the mold in a state in which the inner surface of the mold is exposed to the outside.

According to the powder slush molding method, since the powder slush portion is also used as the mold cooling portion, the entire powder slush molding machine may be further reduced in size. Accordingly, the size of the powder slush molding machine may be reduced and the molding time of the sheet-like material may be shortened.

BRIEF DESCRIPTION OF DRAWINGS

FIG. 5 is a side view illustrating the transport device including the preheating portion;

MODES FOR CARRYING OUT THE INVENTION

First Embodiment

Figure 1:
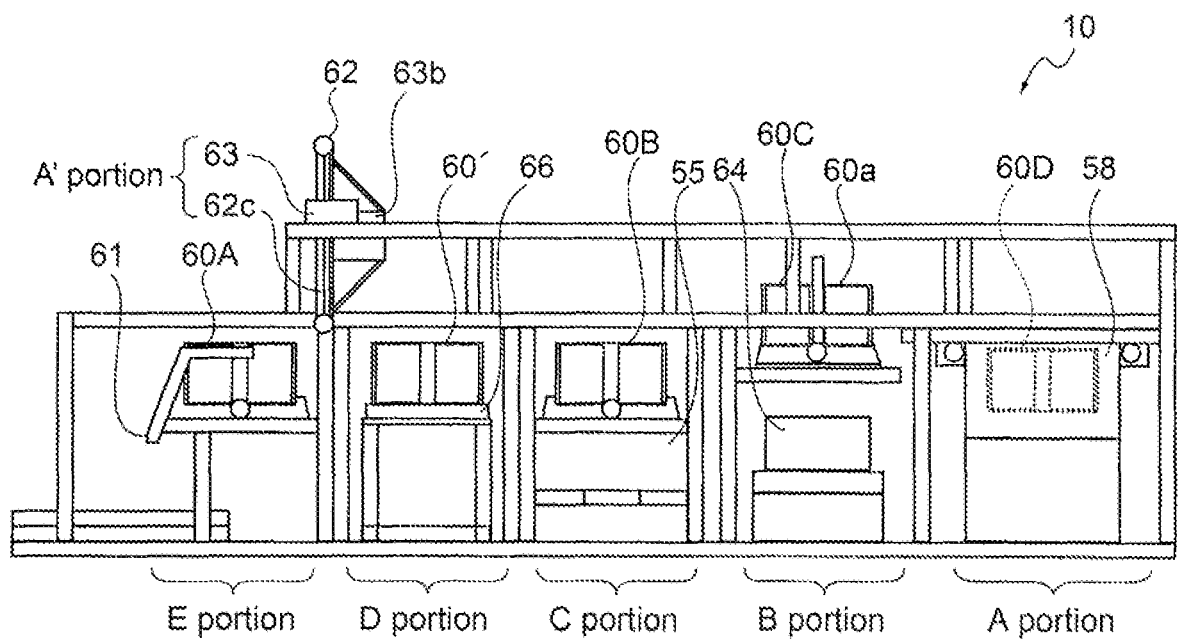
FIG. 1 is a side view illustrating an example of a powder slush molding machine of the invention.
Figure 2:
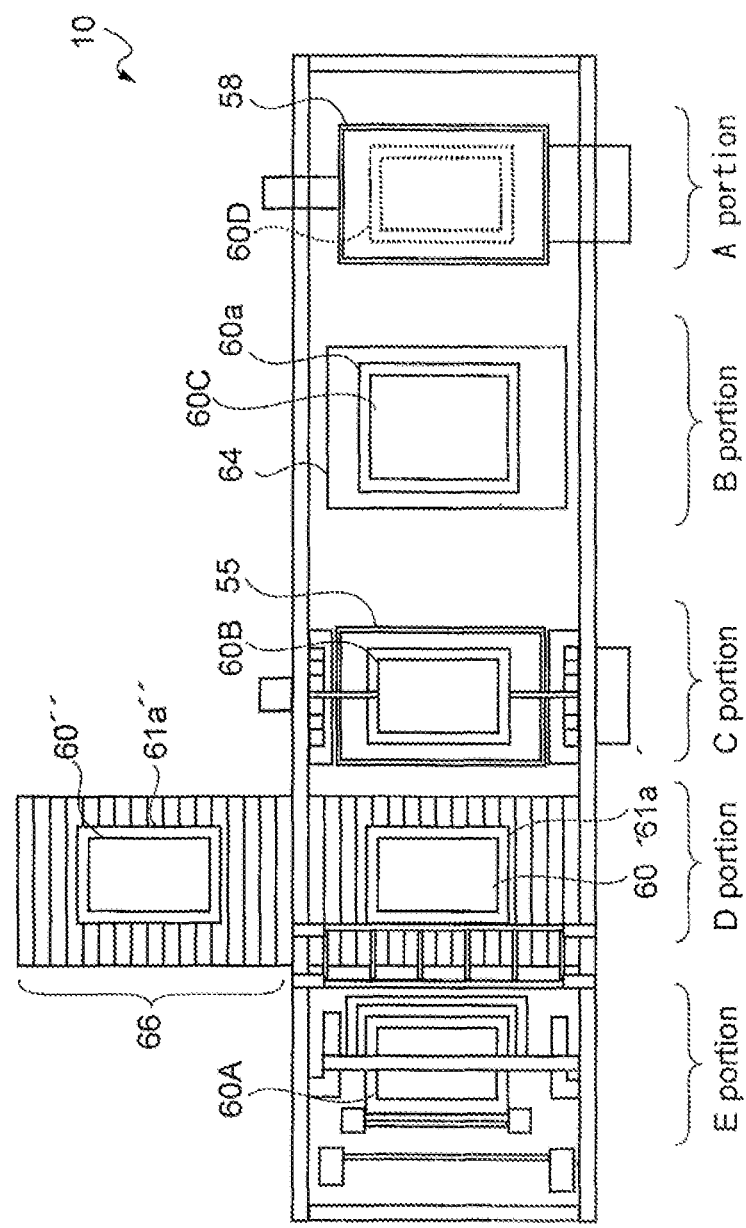
FIG. 2 is a plan view illustrating an example of the powder slush molding machine of the invention.

As illustrated in FIGS. 1 and 2 or FIG. 3, a first embodiment provides powder slush molding machines 10 and 10a. Each of the powder slush molding machines 10 and 10a includes: a mold heating portion (A portion) that heats a mold 60 so that the temperature of the mold 60 is set to a value equal to or higher than a predetermined temperature; a powder slush portion (B portion) that sprays a molding resin, while powdering the molding resin, to mold a sheet-like material 94 having a predetermined thickness on the inner surface of the heated mold 60; a mold cooling portion (C portion) that cools the mold 60 so that the temperature of the mold 60 is equal to or lower than a predetermined temperature; and a mold working portion (E portion) that separates the cooled sheet-like material 94 from the mold 60; and further includes a transport device 62 that moves the mold 60 between the respective portions.

Further, since there are provided the powder slush molding machines 10 and 10a in which a preheating device 63 for heating at least the outer surface of the mold 60 is provided at a part of the transport device 62 as illustrated in FIGS. 4 and 5, the above-mentioned problems may be solved.

The powder slush molding machines 10 and 10a of the first embodiment will be described in detail below with reference to the drawings.

Meanwhile, FIGS. 1 and 2 are a side view and a plan view (the transport device is not illustrated) of the powder slush molding machine 10 in which the powder slush portion (B portion) and the mold cooling portion (C portion) are independent of each other, respectively.

Figure 3A:
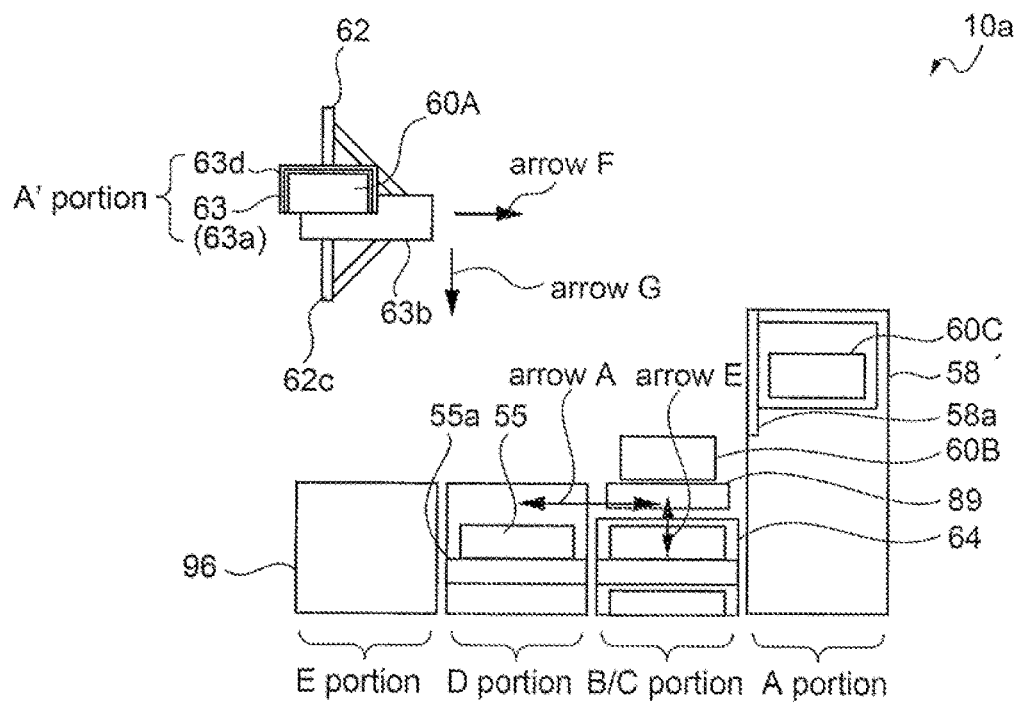
FIGS. 3(a) and 3(b) are a side view and a plan view illustrating another powder slush molding machine of the invention.
Figure 3B:
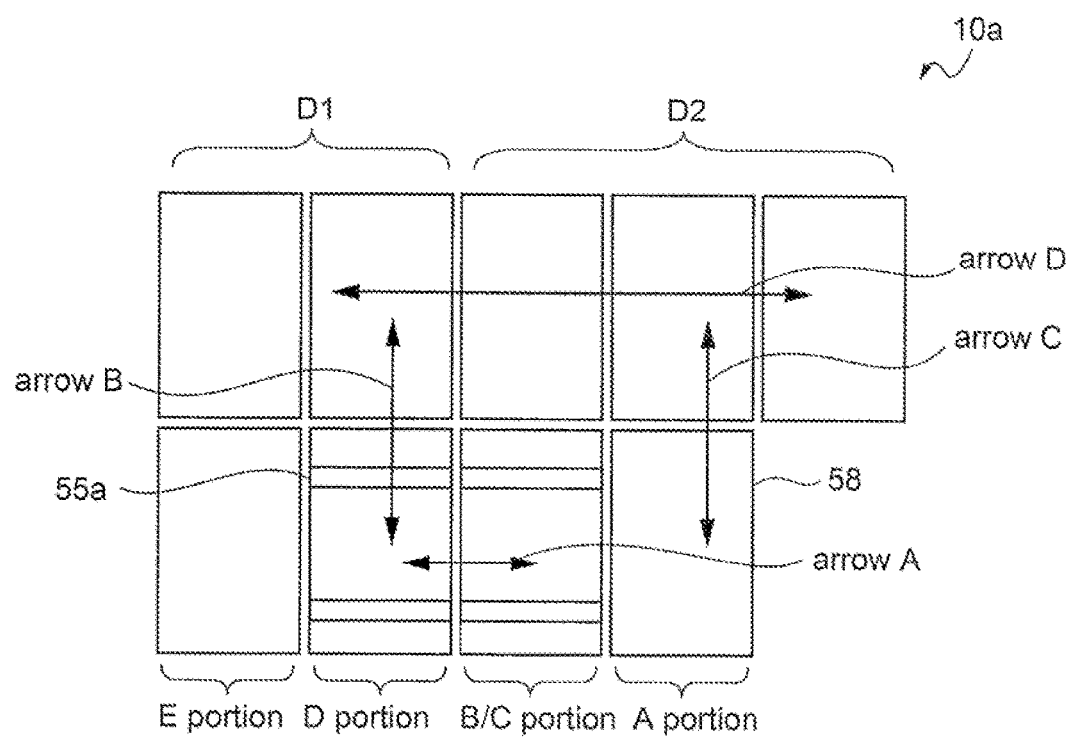

Further, FIGS. 3(a) and 3(b) are a side view and a plan view of the powder slush molding machine 10a in which the powder slush portion (B portion) and the mold cooling portion (C portion) are integrated with each other (B portion/C portion), respectively.

Figure 4A:
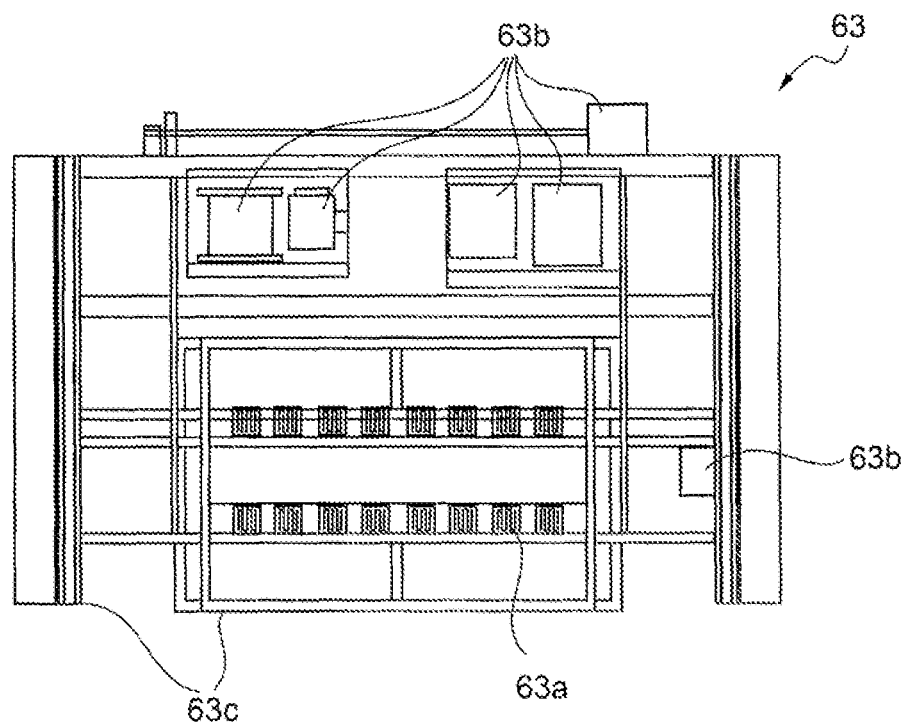
FIGS. 4(a) and 4(b) are a plan view and a front view illustrating a transport device including a preheating portion.
Figure 4B:
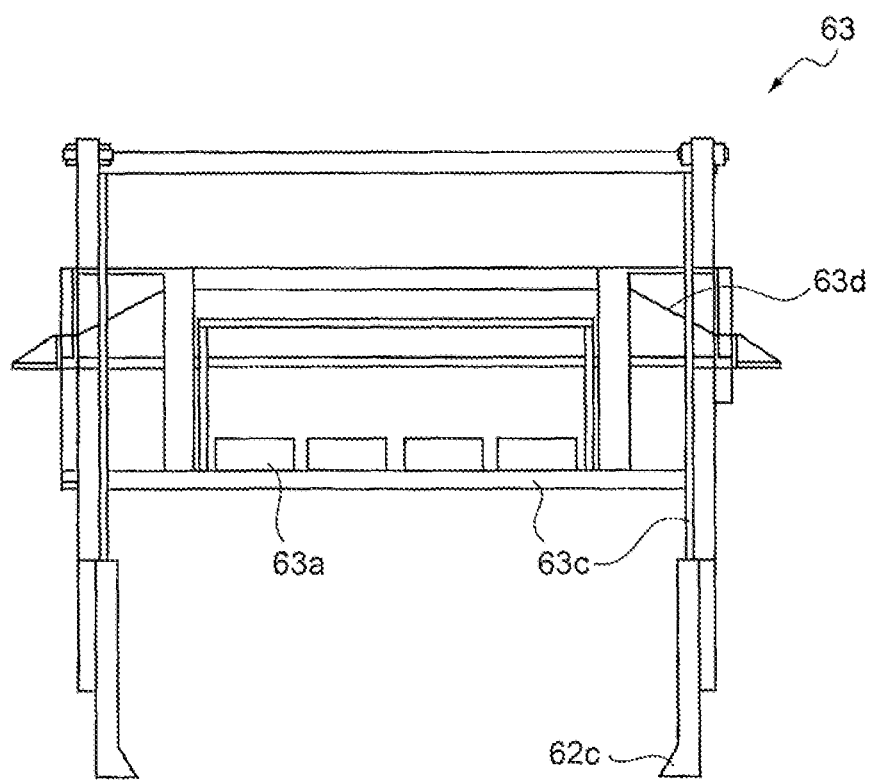

Furthermore, FIGS. 4(a), 4(b), and 5 are a top view, a front view, and a side view (a state in which the mold 60 is mounted) of the transport device 62 including the preheating device 63, respectively.

1. Basic Configuration

On the premise of the use of at least four molds 60 (60A, 60B, 60C, and 60D), the powder slush molding machine 10 illustrated in FIGS. 1 and 2 has basic configuration for moving the mold working portion (E portion), a preheating portion (A' portion), the mold heating portion (A portion), the powder slush portion (B portion), the mold cooling portion (C portion), a mold replacement portion (D portion), and the mold working portion (E portion) again in this order by the transport device 62 including the preheating device 63 at predetermined times.

Further, on the premise of the use of at least three molds 60 (60A, 60B, and 60C), the powder slush molding machine 10a illustrated in FIG. 3 has basic configuration for moving the mold working portion (E portion), a preheating portion (A' portion), the mold heating portion (A portion), an integrated portion (B portion/C portion) including the powder slush portion and the cooling portion, a mold replacement portion (D portion), and the mold working portion (E portion) again in this order by the transport device 62 including the preheating device 63 at predetermined times.

Further, a series of processing for completing powder slush molding are performed in parallel in the respective powder slush molding machines 10 and 10a, so that the sheet-like material 94 as a resin molding may be finally obtained rapidly and stably.

2. Mold Working Portion

The mold working portion (E portion) illustrated in FIG. 1 and the like is a portion for performing a separation operation for taking the sheet-like material 94, which has been subjected to powder slush molding, out of the molds 60.

Further, as illustrated in FIG. 1 and the like, the mold 60 is mounted on a frame member 61 for ease in movement and rapid processing, and is adapted to be capable of be arbitrarily moved between predetermined portions from the mold working portion (E portion) as a starting point together with the frame member 61 by the transport device (for example, a crane) 62.

More specifically, as illustrated in FIG. 3(a), the transport device 62 may arbitrarily move along an arrow F indicating a horizontal direction and an arrow G indicating a vertical direction while gripping each mold 60.

Meanwhile, as described later, as illustrated in FIG. 3(a), the preheating device 63 and a drive device 63b including motors and blast fans are provided at the upper portion of the transport device 62 as the preheating portion (A' portion). Accordingly, the temperature of the mold may be adjusted to a predetermined temperature during the transport of the mold 60.

3. Preheating Device

Further, as illustrated in FIG. 3(a), the preheating device 63 and the drive device 63b including the motors and the blast fans are provided at the upper portion of the transport device 62 as the preheating portion (A' portion). Accordingly, the temperature of the mold may be adjusted to a predetermined temperature during the transport of the mold 60.

More specifically, as illustrated in FIGS. 4 and 5, the mold 60 is transferred to the mold heating portion (A portion) from the mold working portion (E portion) by the transport device (for example, crane) 62. However, in this case, it is preferable that the transport device 62 is provided with the preheating device 63 for heating at least the outer surface of the mold 60.

That is, not only the outer surface (B surface), which is a non-formation surface of the sheet-like material 94 on the mold 60, but also the inner surface (A surface), which is a formation surface of the sheet-like material 94, may be preheated to a predetermined temperature using the transport time of the mold 60 by the preheating device 63.

For this reason, the entire mold may be uniformly and rapidly heated to a predetermined temperature during preheating and main heating regardless of the shape (a curve, a dent, an offset, and the like) of the inner surface of the mold 60.

Further, since a temperature difference between the inner surface and the outer surface of the mold 60 is reduced by the preheating device 63, the entire mold may be uniformly and rapidly heated while the occurrence of the metal fatigue of the mold 60 and the occurrence of a baking phenomenon of a molding resin on the inner surface is effectively suppressed.

Moreover, since the mold may be supplementally heated by the preheating device 63, a post-heating furnace for further curing a sheet material molded once may be substantially omitted. Accordingly, since being reduced in size as much as that, a powder slush molding machine, which is reduced in size and saves a space as a whole, may be provided.

Here, it is preferable that the temperature of the outer surface of the mold 60, that is, a preheat temperature, which is obtained when the mold (for example, made of a nickel casting alloy having a thickness of 3.5 mm) 60 is preheated by the preheating device 63, is set to a value of, for example, 200° C. or less.

The reason for this is that there is a case where a burden on the heating capacity of the preheating device 63 is increased or it is difficult for the mold to reach such a temperature during a transfer time due to the influence of environmental temperature or the influence of the thermal history or the like of the mold 60 when the preheat temperature reaches a value exceeding 200° C.

However, when the preheat temperature is excessively low, there is a case where an effect of supplementing the main heating of the mold 60 is excessively reduced or, on the contrary, the variation of the temperature of the mold during the main heating of the mold 60 is likely to occur.

Accordingly, the preheat temperature is more preferably set to a value within the range of, for example, 100 to 180° C., and is still more preferably set to a value within the range of 120 to 160° C.

Meanwhile, the preheat temperature may be measured by at least one of a thermocouple, an infrared thermometer, a thermography, a power consumption meter, and the like. However, the preheat temperature may be continuously or intermittently measured and the temperature of the outer surface of the mold, which does not yet enter a main heating furnace, may be used as a representative value of the preheat temperature.

Figure 6A:
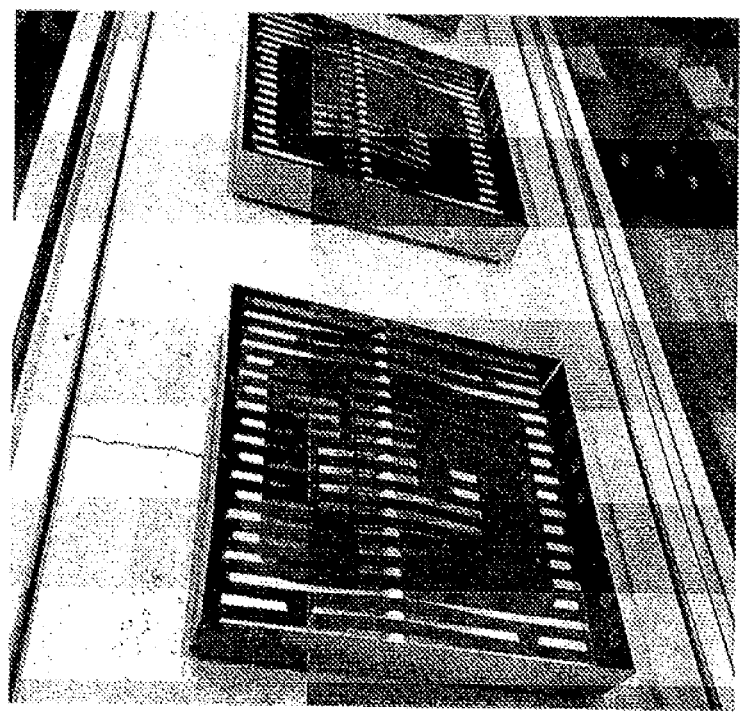
FIG. 6(a) is a diagram (photograph) illustrating far-infrared heating heaters of the preheating portion.
Figure 6B:
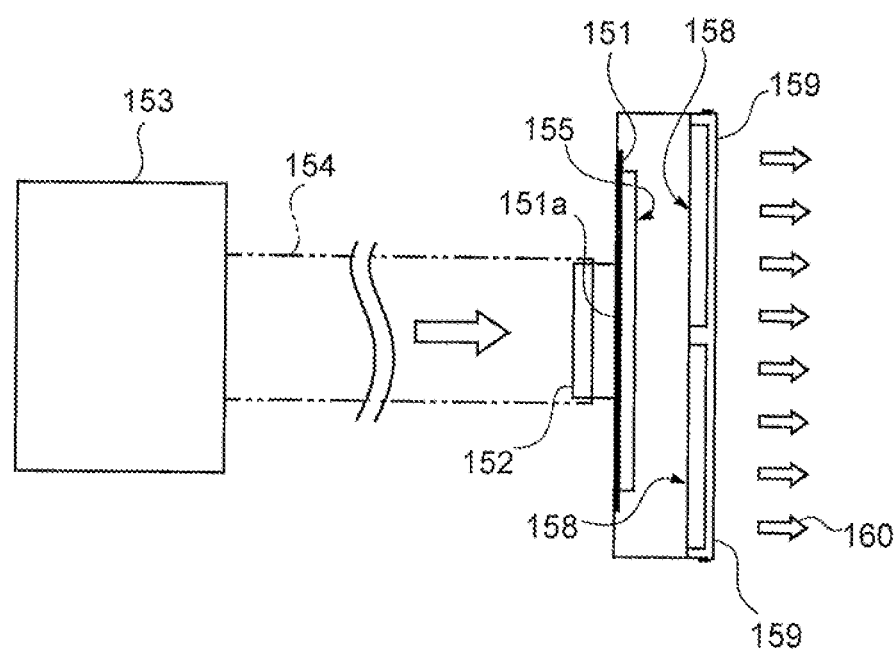
FIG. 6(b) is a schematic diagram illustrating a far-infrared heating heater of another preheating portion.

Further, it is preferable that far-infrared heating heaters (of which some also include blast fans) 63a illustrated in FIGS. 6(a) and 6(b) are provided as the preheating device 63.

FIG. 6(a) is a diagram (photograph) illustrating the appearances of the far-infrared heating heaters (ceramic heaters) 63a as an example. For example, each of the rectangular ceramic heaters 63a has an irradiation area of 250×250 $mm^2$ and can generate heat of 1 to 6 kW by using a rated power supply of three phases, 200 V, and 30 A.

Further, FIG. 6(b) is a cross-sectional view of another far-infrared heating heater (ceramic heater) 63a, and the far-infrared heating heater 63a includes an air blower 153, a hose 154, a hose connecting port 151a, a distribution plate member 155, discharge adjustment members 158 provided with vents, far-infrared radiation heating elements 159, and a housing 151 that are arranged in this order from the rear side.

Furthermore, since the far-infrared radiation heating element 159 uses, for example, a thin strip-shaped conductive material as a substrate and the surface of the substrate is spray-coated with a ceramic material, the far-infrared radiation heating element 159 generates heat and may radiates far-infrared rays 160 forward from the surface of the ceramic material when current flows in the substrate.

Accordingly, since some far-infrared heating heaters use blast fans, far-infrared rays 160 can be more uniformly and rapidly radiated.

That is, since any one of the far-infrared heating heaters 63a is used, far-infrared rays (heat rays) may be applied to not only the entire surface (the A surface and the B surface) of the mold 60 but also an arbitrary place. Accordingly, the entire mold including the inside of the mold may be more uniformly and rapidly preheated regardless of the shape of the inner surface of the mold 60.

Further, since the far-infrared heating heater 63a is relatively light and thin, the preheating device 63 may also be reduced in weight and size, save a space, and the like.

Therefore, even though the preheating device (far-infrared heating heaters) 63 is mounted on a part of the transport device 62, it is possible to transfer the mold 60 smoothly and fast by basically using the transport device (the motors, wires, gears, and the like) 63b in the related art while preheating the mold 60.

Furthermore, it is preferable that the preheating device 63 includes a cover member 63d including an opening opening downward and receiving the mold 60 through the opening as illustrated in FIG. 3(a) and the like.

The reason for this is that the preheating device 63 may physically and reliably grip the periphery of the mold 60 while covering the mold 60 from above since the preheating device 63 includes a substantially bowl-shaped cover member 63d opening downward as described above.

Further, there is an advantage that the cover member 63d may be covered with an aluminum plate, a calcium-silicate plate, a carbon black-containing resin material, or the like as a heat-insulating gripping member.

As a result, the cover member 63d exhibits a predetermined heat insulation property, and may effectively suppress heat radiation even though heat is radiated from the preheated mold 60 to the upper side or the like.

It is found that the temperature of the mold is raised by about 10° C. or more when the mold 60 is merely preheated under a predetermined heating condition in a case in which the non-formation surface of the mold 60 is covered with a carbon black-containing resin material having a thickness of, for example, 20 to 100 μm.

Moreover, since the mold 60 is covered with the carbon black-containing resin material or the like, the reactivity and sensitivity of the mold 60 with respect to an infrared thermometer or the like are improved. Accordingly, there is also an advantage that the temperature of the mold may be measured accurately in a short time.

Next, an example of the transport device 62 including the preheating device 63 and an example of the far-infrared heating heater used for the preheating device 63 will be described in detail with reference to FIGS. 4 to 6.

That is, FIG. 4(a) is a top view of the transport device 62 including the preheating device 63, FIG. 4(b) is a front view of the transport device 62 including the preheating device 63, and FIG. 5 is a side view (a state in which the mold 60 is mounted) of the transport device 62 including the preheating device 63.

Further, the preheating device 63 disclosed in FIGS. 4 and 5 basically includes a plurality of flat plate-like far-infrared heating heaters (also simply referred to as ceramic heaters) 63a illustrated in FIGS. 6(a) and 6(b).

Two rows, each of which is formed of eight ceramic heaters 63a, are disposed so as to form two stages in this example, but the number of the ceramic heaters 63a may be determined in consideration of a heating area, a heating rate, and the like. Accordingly, the number of the ceramic heaters 63a per unit area (10 m²) is generally in the range of 4 to 200, and is more preferably in the range of 8 to 100.

Furthermore, since the flat plate-like ceramic heaters 63a are provided on a heat-insulating base material, which has a thickness of, for example, 0.1 to 10 mm, such as a fiber-reinforced plate containing calcium silicate as a main component, the flat plate-like ceramic heaters 63a are adapted to be capable of intensively radiating heat to the front side.

That is, the plurality of ceramic heaters 63a are adapted to effectively preheat the mold 60 to a predetermined temperature by temperature control means (not illustrated) while being also used in the drive device 63b including the motors and the blast fans.

Further, the mold 60 is mounted at a predetermined position on a frame member 63c of the preheating device 63, that is, a frame member 63c that has a substantially rectangular shape and includes reinforcing members; and is detachably supported by predetermined fixing tools (not illustrated).

Moreover, the drive device 63b including a plurality of motors and the blast fans is mounted on one end of the preheating device 63. The plurality of motors directly or indirectly move the frame member 63c on which the mold 60 is mounted, only the mold 60, or the like in X, Y, and Z directions.

Accordingly, the transport device 62 including the preheating device 63 may preheat not only the outer surface (A surface), which is a non-formation surface of the sheet-like material 94 on the mold 60, but also the inner surface (B surface), which is a formation surface of the sheet-like material 94, to a predetermined temperature by using the transport time of the mold 60.

That is, in consideration of the arrangement and the number of the ceramic heater 63a of the preheating device 63, the mounting position and the mounting direction of the mold 60, and the like, any portion of the mold 60 may also be preheated so as to correspond to the shape of the inner surface of the mold 60 by the plurality of ceramic heaters 63a.

Meanwhile, while another mold (second mold) different from the mold (first mold) to be preheated is also gripped by a hook 62c that is provided at the lower portion of the transport device 62, these molds may be simultaneously transported. Eventually, takt time, which shows manufacturing efficiency per unit time during the manufacture of the sheet-like material 94, may be significantly shortened.

4. Mold Heating Portion (1) Hot Air Generating Unit

The structure of a hot air generating unit 40, which heats the mold 60 (60C), of the mold heating portion (A portion) is not particularly limited as long as the hot air generating unit 40 may efficiently heat the mold 60.

Figure 7:
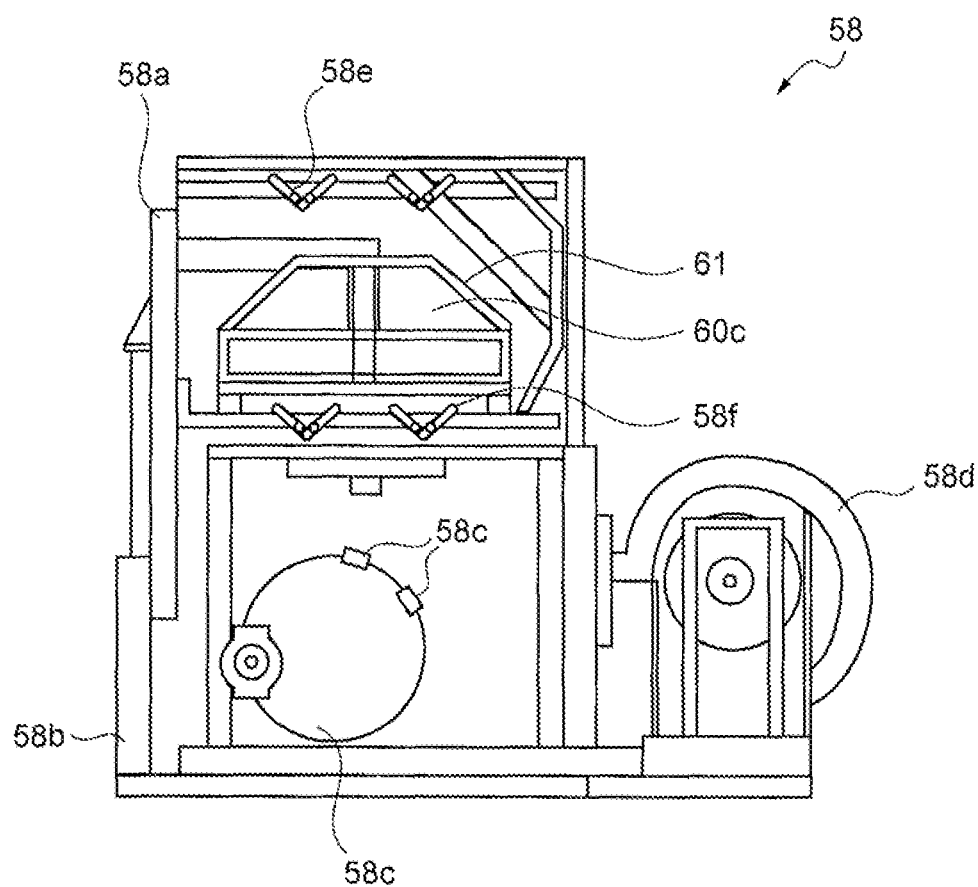
FIG. 7 is a diagram illustrating an example of a mold heating portion.

Accordingly, for example, as illustrated in FIG. 7, a heating furnace of a vertical heating furnace 58' is formed as a box-like body, and the box-like body includes a shutter 58a that is provided on the side surface thereof and may be opened and closed in a vertical direction, and has a rectangular shape in plan view.

More specifically, in regard to the shutter 58a provided with a weight 58b used as a balancer, the mold 60C and the frame member 61 therefor are carried into the furnace from the side in a state in which the weight 58b is raised, that is, a state in which the shutter 58a is opened.

Then, after the mold 60C and the frame member 61 therefor are disposed and fixed at a predetermined portion above a portion where the mold 60C and the frame member 61 therefor are carried into the heating furnace 58, the shutter 58a is closed so that the weight 58b is in a state in which the weight 58b is lowered.

After that, the heating furnace 58' is adapted to be capable of blowing hot air, which is generated in the heating furnace 58' by hot air generating units 58c and 58d, such as gas furnaces, and has a predetermined temperature, from below through louvers 58*f* and uniformly and rapidly heating the mold 60C while circulating hot air by louvers 58*e* provided above the mold 60C.

That is, according to the configuration, the mold 60C and the like are easily carried into the heating furnace 58', and heat energy is easily supplied to the heating furnace 58'. Eventually, a space is also easily saved and heat energy is also easily and efficiently recovered from the heating furnace 58'.

Meanwhile, even though the heating furnace 58' illustrated in FIG. 7 transports a plurality of molds 60, the heating furnace 58' is adapted to perform main heating on only one mold 60. Accordingly, in this case, it is preferable that another mold 60 held by the transport device 62 stands by above the heating furnace 58' until the next step is performed while being preheated.

Further, it is also preferable that hot air 14 obtained from a flame device, which uses propane gas, or the like is supplied from a hot air outlet 16 through a pipe 45 and a main pipe 43 by an air supply fan 46 provided below or on the lower side of the hot air outlet 16 as in another heating furnace 58 illustrated in FIGS. 8(*a*) and 8(*b*).

That is, it is preferable that the hot air 14, which is obtained from such a hot air generating unit 40, and hot air, which is recovered from the inside of a furnace through an energy recovery unit 54 to be described later and is sent to a mixing chamber 44 by an air circulation fan 42, are appropriately mixed with each other in the mixing chamber 44 and are then supplied to the hot air outlet 16 through the main pipe 43 as a large amount of hot air having a predetermined wind speed by the air supply fan 46.

Figure 8A:
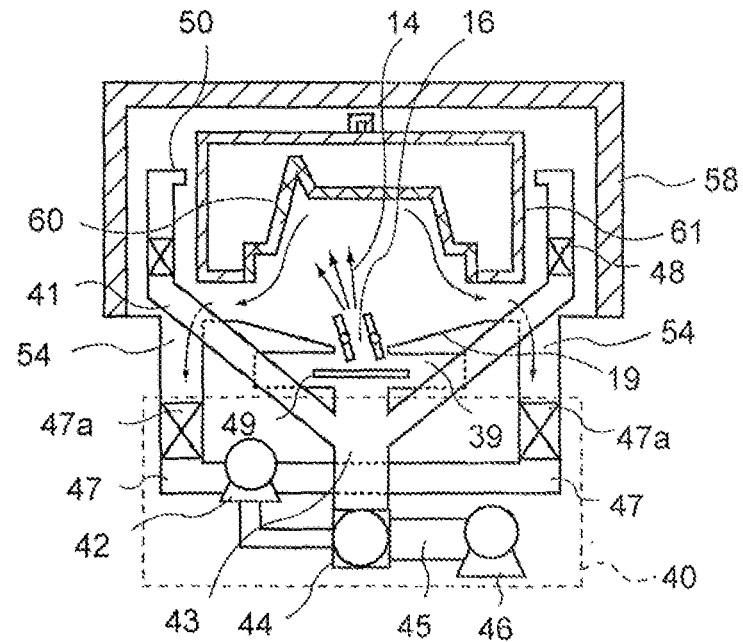
FIGS. 8(a) and 8(b) are diagrams illustrating another mold heating portion.
Figure 8B:
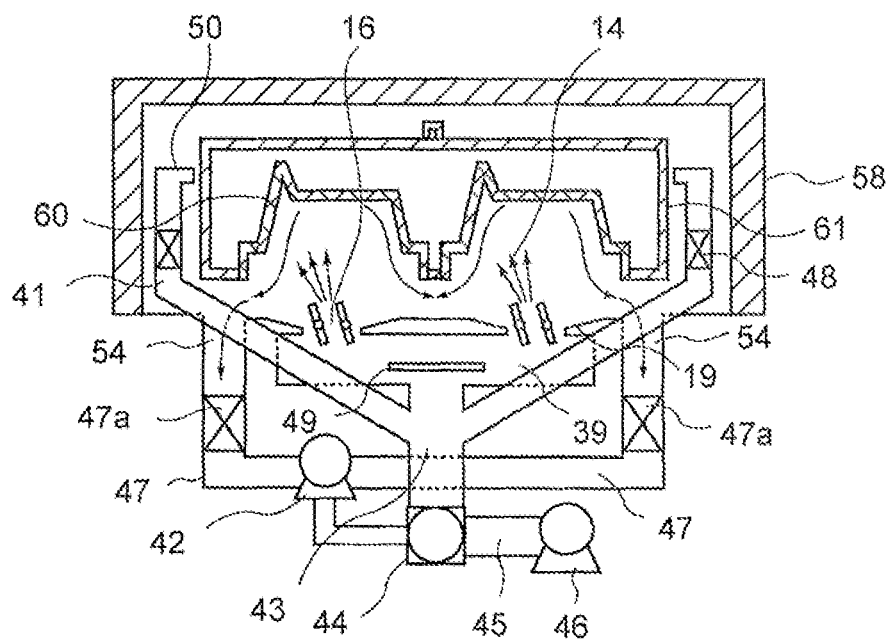

Meanwhile, FIG. 8(*a*) illustrates an example of a heating furnace 58 for a mold 60 that is used to mold one sheet-like material 94 and FIG. 8(*b*) illustrates an example of a heating furnace 58 for a mold 60 that is used to simultaneously mold two sheet-like materials 94.

Further, it is preferable that a hot air storage chamber 39 is provided in the middle of the main pipe 43 and a baffle plate 49 is provided at an outlet portion of the main pipe 43 in the hot air storage chamber 39 as illustrated in FIGS. 8(*a*) and 8(*b*).

Furthermore, it is preferable that the heating furnace 58 is provided with an energy recovery unit 54 for recovering hot air (heat energy), which has heated the mold 60 and has very high temperature and much energy, likewise.

That is, it is preferable that the heating furnace 58 includes an opening passing through an inclined furnace bottom surface 19 of a heating furnace 58 and includes a duct structure including branch pipes 47 connected to the hot air generating unit 40. Further, it is preferable that a damper 47*a* is provided in the middle of each branch pipe 47 connected to the energy recovery unit 54 as already described above.

(2) Heating Furnace

Each of the heating furnaces 58 and 58' of the mold heating portion (A portion) is also referred to as a main heating furnace, but it is preferable that each of the heating furnaces 58 and 58' is disposed above the hot air generating unit 40 and is formed as a compact heating device as a whole as illustrated in FIG. 7 or FIGS. 8(*a*) and 8(*b*).

Further, it is preferable that the main pipe 43 is branched at the outlet portion thereof in the heating furnace 58 as illustrated in FIGS. 8(*a*) and 8(*b*).

Accordingly, it is preferable that each of the heating furnaces 58 and 58' is provided with a duct structure, which has a predetermined height and extends in a vertical direction to be capable of heating the mold 60 present in the heating furnace 58, that is, lateral hot air outlets 50.

Moreover, it is preferable that the lateral hot air outlets 50 are disposed along the inside of the heating furnace 58, and it is preferable that the lateral hot air outlets 50 are connected to branch pipes 41 connected to the hot air generating unit 40 or the main pipe 43 and the air volume of each of the lateral hot air outlets 50 is adjusted by a damper 48 or the like.

Meanwhile, the heating furnace 58' is also a gas furnace using fuel gas, but is adapted to be capable of blowing hot air, which is generated by the hot air generating units 58*c* and 58*d* and has a predetermined temperature, from below through the louvers 58*f* and uniformly and rapidly heating the mold 60 positioned on the upper side.

(3) Temperature

Further, it is preferable that the temperature of the inner surface of the mold 60, that is, the temperature of the mold is set to a value within the range of, for example, 220 to 300° C. when the mold (for example, made of a nickel casting alloy having a thickness of 3.5 mm) 60 is heated by the heating furnaces 58 or 58' in the mold heating portion (A portion).

The reason for this is that there is a case where a gross phenomenon caused by a baking phenomenon of a molding resin frequently occurs or a crack is generated in the mold during cooling due to the metal fatigue of the mold 60 when the temperature of the mold exceeds 300° C.

Accordingly, the temperature of the mold is more preferably set to a value within the range of, for example, 230 to 280° C., and is still more preferably set to a value within the range of 240 to 260° C.

5. Powder Slush Portion (1) Basic Configuration

Figure 9A:
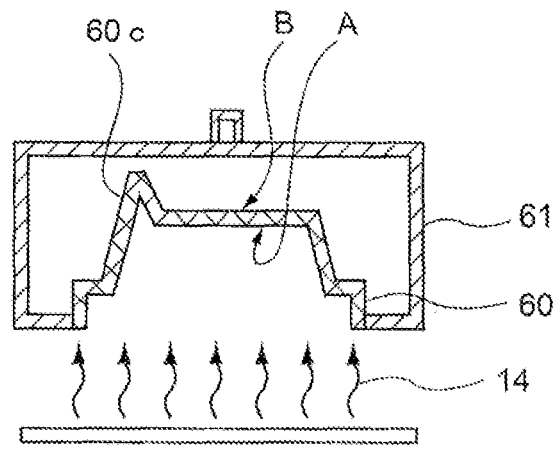
FIGS. 9(a) to 9(c) are diagrams (first diagrams) illustrating a powder slush molding method of the invention.
Figure 9B:
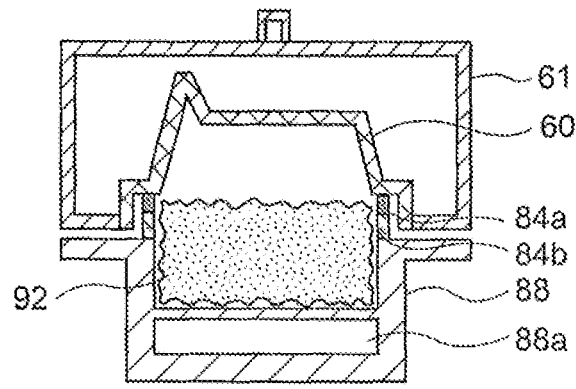
Figure 9C:
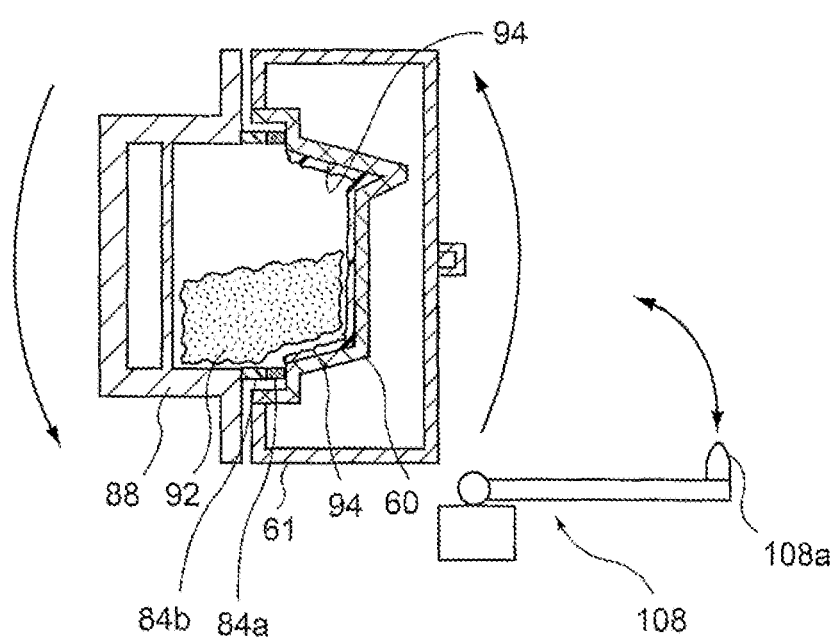
Figure 10A:
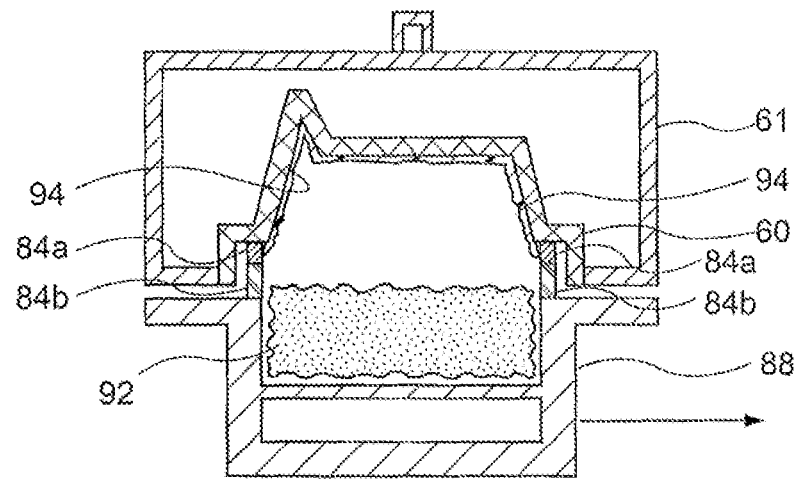
FIGS. 10(a) and 10(b) are diagrams (second diagrams) illustrating the powder slush molding method of the invention.
Figure 10B:
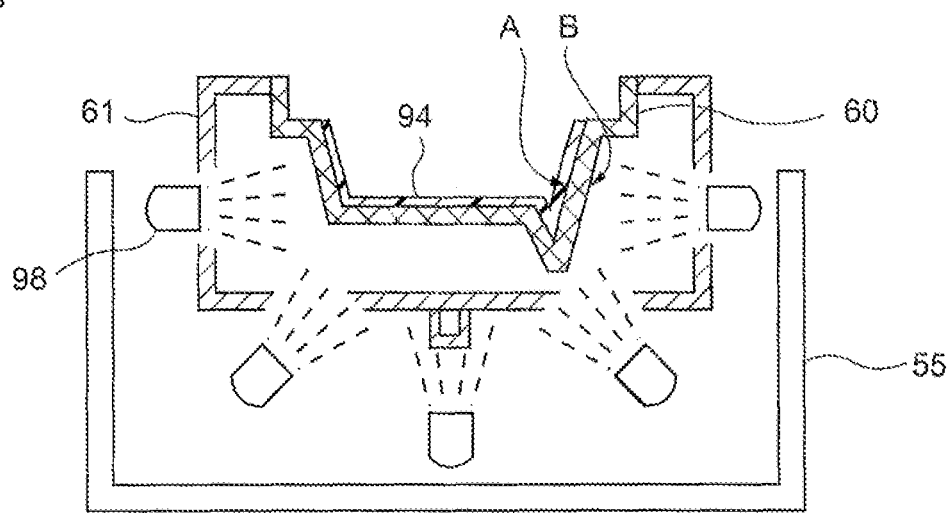

Further, the powder slush portion (B portion) is a portion for performing a step of integrally connecting the heated mold 60 including the frame member 61 to a reservoir tank 88, which stores a molding resin 92 being in a flowing state, in the vertical direction in a state in which the inner surface of the mold 60 denoted by reference character A faces down and the open surface of the reservoir tank 88 faces up as illustrated in FIGS. 9(*a*) to 9(*c*) and FIG. 10(*a*).

More specifically, the powder slush portion for performing a powder slush molding method will be described with reference to FIGS. 9(*a*) to 9(*c*) and FIG. 10(*a*).

That is, as illustrated in FIG. 9(*a*), the mold 60 on which a coating layer (not illustrated) is formed is heated to a predetermined temperature by the hot air 14 of the heating furnace, particularly, the hot air 14 is blown to the inner surface of the mold to heat the mold to a predetermined temperature.

Next, as illustrated in FIG. 9(*b*), the mold 60 is placed after being aligned with the reservoir tank 88 above the reservoir tank 88.

After that, as illustrated in FIG. 9(*c*), the mold 60 is rotated together with the reservoir tank 88.

Then, in order to form the sheet-like material 94 having a uniform thickness through the improvement of the dispersibility of the molding resin 92 stored in the reservoir tank 88 when the mold 60 and the reservoir tank 88 are rotated, it is preferable that air is introduced into a stirring chamber 88*a* provided below the reservoir tank 88 to allow powdery molding resin 92 to be in a flowing state.

That is, it is preferable that the upper portion of the stirring chamber 88*a* is formed of a perforated member, for example, a mesh member and the molding resin 92 is raised by the introduced air.

In addition, it is preferable that a vibrating member provided on the frame member 61 is repeatedly hit by a tip portion 108*a* of a hammer 108 as illustrated in FIG. 9(*c*) so that a uniform film may be formed by the activation of the flowing state of the molding resin 92 during rotation.

After that, as illustrated in FIG. 10(*a*), the mold 60 and the reservoir tank 88 are left for a predetermined time so that the molding resin 92 is settled at a predetermined position. In this case, it is preferable that air is removed and pressure is reduced so that the molding resin 92 is early in a non-flowing state.

Then, in a case in which the powder slush portion (B portion) is integrated with the mold cooling portion (C portion) and a cooling device or the like is adapted to move to cool the mold as described later, the mold is cooled in a powder slush portion/cooling portion.

That is, finally, it is preferable that shower or the like is applied to the sheet-like material 94 formed on the inner surface (A) of the mold 60 and the outer surface (B) of the back side of the mold 60 to cool the sheet-like material 94 and the outer surface (B) as illustrated in FIG. 10(*b*).

However, in a case in which the powder slush portion (B portion) is independent of the mold cooling portion (C portion), the mold having been subjected to powder slush molding is transferred to the mold cooling portion (C portion) and predetermined cooling is performed on the sheet-like material 94 formed on the inner surface A of the mold 60 and the outer surface B of the back side of the mold 60 in the mold cooling portion (C portion).

(2) Formwork

Further, it is preferable that formworks 84*a* and 84*b* having a predetermined thickness (height) are provided between the mold 60 and the reservoir tank 88 in the powder slush portion (B portion) so that the sheet-like material 94 may be formed only on a desired inner surface (A) of the mold 60 when the mold 60 including the frame member 61 is inverted.

Here, in a case in which the lower portion of the formwork 84*b* is made of, for example, aluminum and the upper portion of the formwork 84*a* is made of a combination of silicone rubber/a fluororesin film, the formworks 84*a* and 84*b* may also function to fill a gap between the mold 60 and the reservoir tank 88.

(3) Molding Resin

Further, the molding resin used in the powder slush portion (B portion) is not particularly limited, but examples of the molding resin include one or a combination of two or more of an epoxy resin, a urethane resin (also including a thermoplastic urethane resin), a polyester resin (also including a thermoplastic polyester resin), an acrylic resin, a vinyl chloride resin, an olefin resin (also including a thermoplastic olefin resin), a silicone resin, and the like.

Particularly, since an affinity between a vinyl chloride resin or a thermoplastic urethane resin and a second resin forming a ground layer is good, high adhesiveness is obtained from a vinyl chloride resin or a thermoplastic urethane resin, and a vinyl chloride resin or a thermoplastic urethane resin is excellent in low-temperature brittleness, a vinyl chloride resin or a thermoplastic urethane resin is a preferable resin.

(4) Powdering Time

Further, in order to form a sheet-like material 94 having a uniform thickness as described above, it is preferable that powdering time is set to a value within the range of 18 to 45 sec in the powder slush portion (B portion).

The reason for this is that there is a case where it is difficult to form a sheet-like material 94 having a predetermined thickness since the molding resin is easily melted when the powdering time is set to a value less than 18 sec.

On the other hand, the reason for this is that there is a case where an economical disadvantage is caused since time required to heat the mold to a predetermined temperature, eventually, takt time is excessively lengthened when the powdering time is set to a value exceeding 45 sec.

Accordingly, in the powder slush portion (B portion), powdering time is more preferably set to a value within the range of 20 to 40 sec and is still more preferably set to a value within the range of 25 to 38 sec.

6. Mold Cooling Portion (1) Configuration 1

The mold cooling portion (C portion) is a component portion including a cooling device 55 using a water-cooling method, an air-cooling method, or the like that cools the mold 60 including the frame member 61 to solidify the sheet-like material 94 at a predetermined degree as illustrated in FIG. 10(*b*).

More specifically, the mold cooling portion showers cooling water or sprays cooling mist to the outer surface (B surface) of the mold 60, on which the sheet-like material 94 is formed, by the cooling device 55 to cool the mold 60 to a predetermined temperature.

Meanwhile, it is preferable that the mold cooling portion (C portion) is also used as the powder slush portion (B portion) and the mold cooling portion (C portion) and the like are mobile in the case of the powder slush molding machine 10*a* illustrated in FIG. 3(*a*) and reduced in size.

That is, when the mold 60 is to be cooled, a powder box having been subjected to powder slush is horizontally moved to a box replacement position (D2) from the powder slush portion (B portion) as illustrated in FIG. 3(*b*) by an arrow C.

More specifically, after powder slush molding, the mold 60, which is engaged with a rotating device 89, and the powder box 64 are moved so as to be separated from each other as illustrated by an arrow E.

Accordingly, only the mold 60, which is engaged with the rotating device 89, is moved up and the powder box 64 is horizontally moved toward the box replacement position (D2) from the powder slush portion (B portion).

That is, in FIG. 3(*b*), the powder box 64 is horizontally moved up along the arrow C and is then appropriately horizontally moved along an arrow D in a right lateral direction or in a left lateral direction in some cases.

Meanwhile, a place where the box replacement position (D2) is disposed is not particularly limited. However, since the powder box 64 has only to be moved substantially horizontally, it is preferable that the box replacement position (D2) is provided in an outer region (the upper side in FIG. 3(*b*)) adjacent to the powder slush portion (B portion) as illustrated in FIG. 3(*b*).

Next, as illustrated in FIGS. 3(*a*) and 3(*b*), the cooling device 55 provided in the mold cooling portion (C portion) is horizontally moved directly below the rotating device 89 of the powder slush portion (B portion) as illustrated by an arrow A and is engaged with the frame member (not illustrated) that grips the mold 60.

More specifically, the cooling device 55 provided in the mold cooling portion (C portion) is moved along a drive rail 55*a*, and is moved to a position directly below the mold 60 engaged with the rotating device 89.

Accordingly, the mold 60 is inverted by the rotating device 89 and is in a state in which the inner surface (A surface) on which the sheet-like material 94 is formed opens upward, and the cooling device 55 and the mold 60 are engaged with each other in a state in which the cooling device 55 and the outer surface (B surface) of the mold 60 face each other.

Then, cooling water is showered or cooling mist is sprayed to the outer surface (B surface) of the mold 60 by the cooling device 55.

Meanwhile, the cooling device 55 provided in the mold cooling portion (C portion) and the mold 60 may also be appropriately replaced.

That is, in FIG. 3(b), the cooling device 55 and the mold 60 are horizontally moved up along an arrow B, is then appropriately horizontally moved along the arrow D in a left direction or in a right direction in some cases, and may be replaced at a predetermined place.

Figure 11:
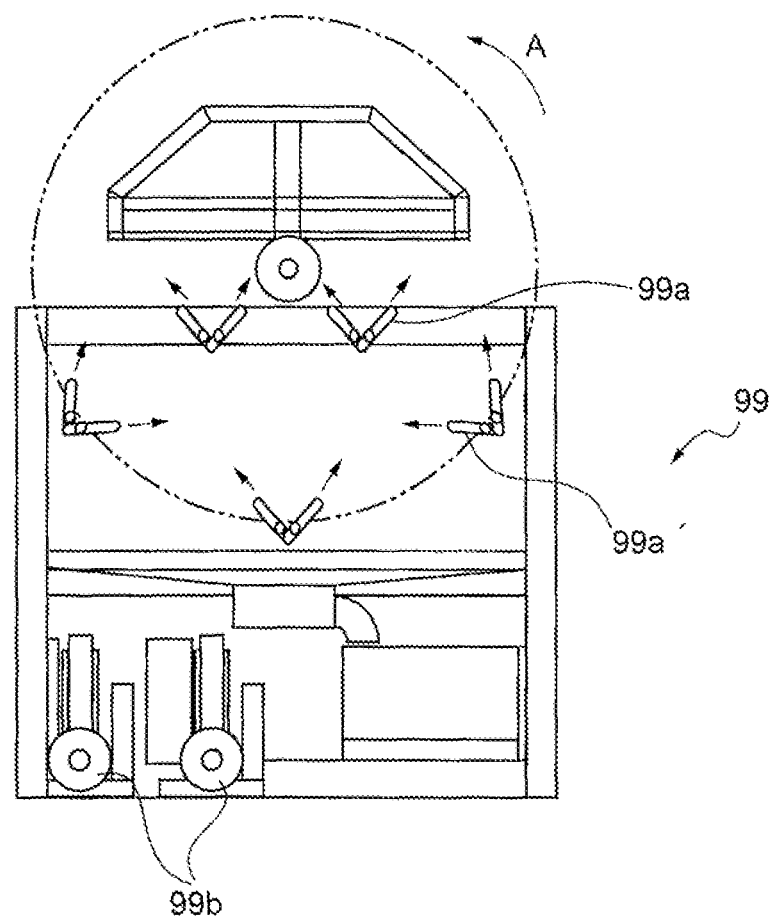
FIG. 11 is a diagram illustrating a drying device.

Moreover, it is preferable that dry air is blown to the mold 60, the sheet-like material 94, and the like by a drying device 99 as illustrated in FIG. 11 after the back (B surface) of the mold 60 is cooled to a predetermined temperature in the mold cooling portion (C portion).

More specifically, the mold 60 is rotated in a direction of an arrow A along an ideal circle illustrated by a two-dot chain line, and the B surface, which is a surface on which a sheet is formed, faces down.

Next, dry air is blown to the formed sheet-like material 94, the mold 60, and the like to lower the temperatures of these and to remove moisture and the like adhering to the surface of the sheet-like material 94 and the like.

Accordingly, since the drying processing is performed, the driving time of the cooling device 55 provided in the mold cooling portion (C portion) may be shortened and a higher-quality sheet-like material 94 may be obtained by the control of the water absorption coefficient of the sheet-like material 94.

Meanwhile, the drying device 99 mainly includes a plurality of outlets 99a and an air blower 99b, and is provided with oscillating mechanisms for changing spray angles of tip portions of these outlets 99a in the range of about 180° as a whole.

More specifically, the plurality of outlets 99a that are provided along the lower wall of the drying device 99, and a plurality of outlet 99a', which are positioned directly below the mold 60 to directly dry the formed sheet-like material 94 and the like, are provided.

Accordingly, for example, air or the like having a wind speed 1 to 100 m/sec may be blown to the sheet-like material 94 and the like while spray angles of air from the outlets are changed or are fixed at constant angles.

Figure 12A:
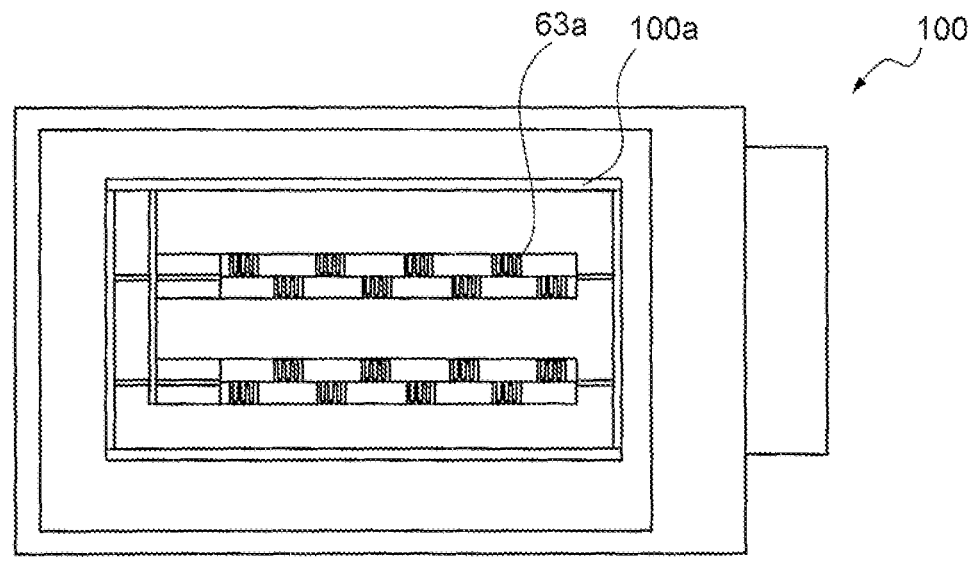
FIGS. 12(a) and 12(b) are diagrams illustrating a heating device.
Figure 12B:
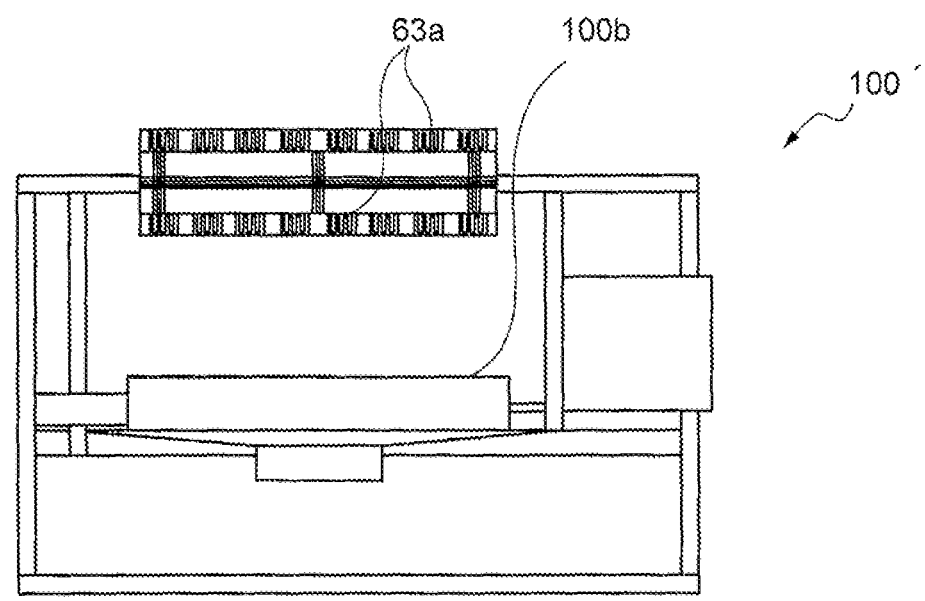

Moreover, it is also preferable that the formed sheet-like material 94 and the mold 60 are heated to a predetermined temperature by heating devices 100 and 100' as illustrated in FIGS. 12(a) and 12(b) after or before the back (B surface) of the mold 60 is cooled to a predetermined temperature in the mold cooling portion (C portion).

That is, it is preferable that the cooling device of the mold cooling portion (C portion) and the heating device 100 or 100' is provided instead of the drying device or together with the drying device, and the formed sheet-like material 94 is heated by far-infrared ceramic heaters or the like.

Accordingly, in the case of the heating device 100 illustrated in FIG. 12(a), the mold 60 including the formed sheet-like material 94 is placed above a part of a frame member 100a and is subjected to heating processing from below.

Accordingly, the molding resin, which is insufficiently melted, may be more uniformly melted in the sheet-like material 94 or the sheet-like material 94 may be rapidly dried.

On the other hand, in the case of the heating device 100' illustrated in FIG. 12(b), the mold 60 including the formed sheet-like material 94 is placed on a predetermined frame 100b below the far-infrared ceramic heaters 63a or the like and is subjected to heating processing from above. Even in this case, the molding resin, which is insufficiently melted, may be melted in the sheet-like material 94 or the sheet-like material 94 may be rapidly dried.

(2) Configuration 2

Further, the mold cooling portion is not limited to a mobile type or a stationary type, and it is preferable that the mold cooling portion has mold cooling configuration having at least three steps using combinations of first air blow, mist/shower, and second air blow.

That is, first, it is preferable that air as first air is blown to the inside and outside of the mold 60, on which a sheet-like material 94 is formed and of which temperature is about 150° C., to lower the temperature of the mold to about 100° C.

After that, it is preferable that water mist and water shower are sprayed from the outside of the mold from a mist nozzle and a shower nozzle or any one nozzle 98 thereof to lower the temperature of the mold to about 50° C.

Finally, it is preferable that air as second air is blown to the outer surface and the inner surface of the mold 60, on which the sheet-like material 94 is formed and which is cooled to about 50° C., to remove accumulated heat corresponding to the temperature of the mold, to blow water droplets and the like remaining on the surface of the mold off, and to effectively prevent the mold from rusting.

Accordingly, it is preferable that the mold cooling portion (C portion) includes the nozzle 98, such as the shower nozzle/the mist nozzle, and an air nozzle (not illustrated) together as the cooling device 55.

Meanwhile, it is also preferable that a shower device and a mist device are connected to one water supply tank and the amount of spray and the amount of shower are determined by switching devices, such as control valves provided at outlets.

(3) Temperature/Time

Further, the mold cooling portion (C portion) is not limited to a mobile type or a stationary type, and it is preferable that the mold cooling portion cools the mold 60 on which the sheet-like material 94 is formed by at least three steps to set the temperature of the mold to a value of 60° C. or less.

The reason for this is that there is a case where it is difficult to perform separation as the next step or the application of a second resin of the next cycle when the temperature of the mold exceeds 60° C.

However, since there is a case where cooling time is excessively lengthened when the temperature of the mold is excessively lowered, it is preferable that the temperature of the mold having been subjected to cooling is set to a value of 30° C. or more.

Accordingly, in the mold cooling portion, the temperature of the mold including the sheet-like material 94 is more preferably set to a value within the range of 30 to 50° C. and is still more preferably set to a value within the range of 40 to 45° C.

Further, the mold cooling portion (C portion) is not limited to a mobile type or a stationary type likewise, and it is preferable that cooling time is set to a value within the range of 25 to 50 sec.

The reason for this is that there is a case where it is difficult to set the temperature of the mold 60, on which the sheet-like material 94 is formed, to a value equal to or lower than a predetermined value when the cooling time is set to a value less than 25 sec.

On the other hand, the reason for this is that there is a case where an economical disadvantage is caused since time required to cool the mold to a predetermined temperature, eventually, takt time is excessively lengthened when the cooling time is set to a value exceeding 50 sec.

Accordingly, in the mold cooling portion, cooling time is more preferably set to a value within the range of 30 to 45 sec and is still more preferably set to a value within the range of 35 to 40 sec.

(4) Cooling Rate (Temperature Gradient)

Further, the mold cooling portion (C portion) is not limited to a mobile type or a stationary type likewise, and it is preferable that the cooling rate of the mold, that is, a temperature gradient during cooling is set to a value within the range of 100 to 220° C./min.

The reason for this is that there is a case where an economical disadvantage is caused since time required to cool the mold to a predetermined temperature, eventually, takt time required until one product of the sheet-like material 94 is obtained is excessively lengthened when the cooling rate of the mold is set to a value less than 100° C./min.

On the other hand, there is a case where a crack is likely to be generated since the mold is rapidly cooled and thermal fatigue is significantly increased when the cooling rate of the mold is set to a value exceeding 220° C./rain.

Accordingly, in the mold cooling portion (C portion), the cooling rate of the mold is more preferably set to a value within the range of 120 to 210° C./min and is still more preferably set to a value within the range of 140 to 200° C./min.

7. Mold Replacement Portion

Further, it is preferable that the powder slush molding machine of the first embodiment further includes a mold replacement portion (D portion).

That is, the reason for this is to cope with a case in which the mold is changed to a mold used to mold different kinds of two-color molded sheet-like materials by the mold replacement portion (D portion) during the powder slush molding or damage to the mold is generated during the powder slush molding.

That is, the reason for this is that the mold may be replaced while the powder slush molding machine is operated even in that case.

Meanwhile, the mold replacement portion (D portion) is a portion (temporary stand) on which the cooling device 55 is temporarily placed in a case in which the mold cooling portion (C portion) is a mobile type and powder slush molding is performed.

Accordingly, it is preferable that the mold replacement portion (D portion) includes a support 66 on which the mold 60 is placed as illustrated in FIGS. 1 and 2 and the position of the support 66 may be moved by external control.

Meanwhile, in an example of the mold replacement portion (D portion) illustrated in FIG. 2, a replacement mold 60' and a frame member 61a' for the replacement mold 60' stand by on the support 66 and another replacement mold 60'' and a frame member 61a'' stand by on a support 66 extending upward.

In addition, it is preferable that the mold replacement portion (D portion) is provided with the cooling device 55 as illustrated in FIG. 3(b) and the cooling device 55 is moved after powder slush molding.

Moreover, in a case in which the cooling device 55 and the mold 60 are to be replaced, the mold 60 and the like are appropriately horizontally moved by using a region D1 illustrated in FIG. 3(b) and may be replaced with a new cooling device 55 and a new mold 60.

That is, in FIG. 3(b), the mold 60 and the like are horizontally moved up along the arrow B in FIG. 3(b) and are then appropriately horizontally moved along the arrow D in a right lateral direction or in a left lateral direction in some cases.

8. Sheet-Like Material

It is preferable that the thickness of the sheet-like material 94 is generally set to a value within the range of 1.1 to 1.6 mm and is more preferably set to a value within the range of 1.2 to 1.4 mm in regard to the form of the sheet-like material 94 to be subjected to powder slush molding and illustrated in FIG. 9 and the like, and the sheet-like material 94 is made of, for example, at least one of an epoxy resin, a vinyl chloride resin, an acrylic resin, an olefin resin (also including a thermoplastic olefin resin), a urethane resin (also including a thermoplastic urethane resin), a polycarbonate resin, or a polyester resin (also including a thermoplastic polyester resin).

The reason for this is that a sheet-like material 94, which has high versatility, is inexpensive, and is excellent in decorativeness, may be provided in a case in which the sheet-like material 94 is formed as described above.

Second Embodiment

A second embodiment provides a powder slush molding method using the powder slush molding machine 10a illustrated in FIGS. 3(a) and 3(b) and the like. The powder slush molding machine 10a includes: a mold heating portion (A portion) that heats a mold 60 so that the temperature of the mold is set to a value equal to or higher than a predetermined temperature; a powder slush portion (B portion) that sprays a molding resin, while powdering the molding resin, to mold a sheet-like material 94 having a predetermined thickness on the inner surface of the heated mold 60; a mold cooling portion (C portion) that cools the mold 60 so that the temperature of the mold 60 is equal to or lower than a predetermined temperature; and a mold working portion (E portion) that separates the cooled sheet-like material 94 from the mold 60. The powder slush molding machine 10a further includes a transport device 62 that moves the mold 60 between the respective portions, and a preheating device 63 that heats the mold 60 and is provided at a part of the transport device 62.

Further, as illustrated in FIGS. 3(a) and 3(b) and the like or FIGS. 4 and 5, the powder slush molding method includes: a step of gripping the mold 60 and transferring the mold 60 to the mold heating portion (A portion) from the mold working portion (E portion) by the transport device 62; a step of heating the mold 60 in the mold heating portion (A portion) so that the temperature of the mold is set to a value equal to or higher than a predetermined temperature; a step of spraying a molding resin, while powdering the molding resin, to mold a sheet-like material 94 having a predetermined thickness on the inner surface of the heated mold 60 after gripping the heated mold 60 and transferring the heated mold 60 to the powder slush portion (B portion) from the mold heating portion (A portion) by the transport device 62; a step of cooling the mold 60; and a step of separating the cooled sheet-like material 94 from the mold 60. The mold 60 is heated by the preheating device 63, which is provided at a part of the transport device 62, during the step of gripping the mold 60 and transferring the mold 60 to the mold heating portion (A portion) from the mold working portion (E portion) by the transport device 62.

The powder slush molding method of the second embodiment will be described in detail below.

1. Mold Preparation Step

A mold preparation step is a step of preparing another predetermined mold 60 for the next step after performing a separation operation for taking the sheet-like material 94, which has been subjected to powder slush molding, out of the molds 60 in the mold working portion (E portion) illustrated in FIG. 1 and the like.

2. Preheating Step

Next, a preheating step is a step (hereinafter, referred to as a preheating step) of heating the mold 60, which is mounted on the mold working portion (E portion), by the preheating device 63 provided at a part of the transport device (a crane or the like) 62 so that the temperature of the mold (for example, the temperature of the outer surface) is in the range of, for example, 100 to 200° C.

That is, the preheating step is a step of preliminarily heating the mold 60 while moving the mold 60 to the mold heating portion (A portion) from the mold working portion (E portion) so that the temperature of the mold 60 reaches a predetermined temperature.

Further, in the preheating step, the preheating device 63 is operated to set the temperature of the gripped mold 60 to a temperature preferably in the range of, for example, 100 to 200° C., to a temperature more preferably in the range of 165 to 195° C., and to a temperature still more preferably in the range of 170 to 190° C.

The reason for this is that a temperature difference between the inner surface and the outer surface of the mold 60 is reduced in the heating furnace 58, the thermal degradation of the mold 60 is prevented, and the mold 60 is more easily heated rapidly and uniformly when main heating is performed so that the temperature of the mold 60 is set to a predetermined temperature (for example, 250 to 300° C.), since the mold 60 is preheated to such a temperature.

Further, it is preferable that the transport device 62 grips the mold 60 and the preheating device 63 is switched on at the same time to preheat the mold 60 in the preheating step.

The reason for this is that the transfer time of the mold 60 may be sufficiently used since the mold 60 is preheated in synchronization with an operation for gripping the mold 60 as described above.

However, even though the mold 60 is gripped and the preheating device 63 is switched on at the same time, the preheating device 63 does not necessarily need to be switched on as soon as the mold 60 is gripped and may be switched on after 0.1 sec or 1 sec from the gripping of the mold 60 in accordance with the circumstances of the powder slush molding and the like.

Moreover, in order to prevent the temperature fall of the mold 60 during the transport of the mold 60, it is also preferable that preheating processing is performed while another mold 60 is clamped by the transport device 62 during the heating processing of still another mold in the preheating step.

The reason for this is that the formation of the sheet-like material 94 on the mold 60 having been subjected to heating processing, which is performed in the integrated portion (B portion/C portion) including the powder slush portion, may be more rapidly and stably performed by predetermined preheating processing, eventually, molding time (takt time) per sheet-like material may be further shortened.

Meanwhile, the mold 60 is moved to the powder slush portion (B portion) after being subjected to heating processing using the circulation of hot air of the heating furnace 58 until the temperature of the mold 60 reaches, for example, 260° C. as described later.

In this case, even while the mold 60 is transferred to the powder slush portion (B portion), the temperature of the mold 60 may be maintained at a value within the range of a desired temperature through heating for maintaining a temperature by the preheating device 63.

That is, since the mold 60 may also be heated by the preheating device 63 so that the temperature of the mold 60 is maintained, the sheet-like material 94 may be more stably molded in the powder slush portion (B portion).

3. Heating Step

Next, a heating step is a step (hereinafter, referred to as a heating step) of heating the mold 60 in the mold heating portion (A portion) so that the temperature of the mold is in the range of, for example, 220 to 300° C. and more preferably in the range of 230 to 270° C.

Accordingly, it is preferable that a predetermined mold 60 is moved to the mold heating portion (A portion) so as to be carried into the heating furnace 58 and is rapidly heated in the heating furnace 58 so that the temperature of the mold 60 is set to a predetermined temperature.

Meanwhile, it is preferable that convection heating using hot air is performed so that a sheet-like material 94 having a uniform thickness may be molded in a powder slush step as a post-step and the temperature of the mold 60 is set to a predetermined uniform temperature when the heating step is performed as described above.

4. Powder Slush Step

After that, a powder slush step is a step (hereinafter, simply referred to as a slush step) of molding a predetermined sheet-like material 94 on the mold 60 in the powder slush portion (B portion).

That is, the powder slush step is a step of moving the heated mold 60 to the powder slush portion (B portion) from the mold heating portion (A portion) and forming the sheet-like material 94, which is made of the molding resin 92, in the powder slush portion (B portion) as illustrated in FIG. 9(*c*).

However, as described above, in the case of the powder slush molding machine 10*a* illustrated in FIG. 3(*a*), the powder slush portion (B portion) is integrated with the mold cooling portion (C portion) and the cooling device 55 and the like are mobile. Accordingly, the powder slush step is performed by a predetermined portion (B portion/C portion) including the powder slush portion and the mold cooling portion.

That is, when the mold 60 is to be cooled, the powder box having been subjected to powder slush is horizontally moved to the box replacement position (D2) from the powder slush portion (B portion) as illustrated by the arrow C as illustrated in FIG. 3(*b*).

Here, when the slush step is to be performed, it is preferable that the mold 60 including the frame member 61 and the reservoir tank are rotated in a state, in which the mold 60 and the reservoir tank are connected to each other, to form a sheet-like material 94 having a predetermined thickness on the inner surface of the mold 3 denoted by reference character A regardless of whether or not the slush step is performed by the predetermined portion (B portion/C portion) including the powder slush portion and the mold cooling portion.

That is, it is preferable that the mold 60 is inverted in a vertical direction in a state in which the mold 60 including the frame member 61 and the reservoir tank 88 are combined with each other.

The reason for this is as follows: when the slush step is performed as described above, the molding resin (powder) 92 stored in the reservoir tank 88 falls onto the inner surface (A surface) of the mold 60 due to its own weight. Accordingly, since only a molding resin 92 being in contact with the inner surface of the mold 60 and a molding resin 92 present near the molding resin 92 are melt by the heat of the mold 60 and adhere to the mold, a sheet-like material 94 may be formed in a short time.

Accordingly, it is understood that heating the mold so that the temperature of the mold is set to a value of 220° C. or less, adjusting powdering time, and performing heating processing after hot air having a temperature of 200° C. or less is sprayed to the back surface of the sheet-like material are effective.

Further, it is preferable that air is sucked through the stirring chamber 88a to lower the pressure in the mold 60 so that the molding resin 92 may form a sheet-like material 94 only on a desired inner surface (A surface) of the mold 60 without being scattered to a portion other than a predetermined portion when the mold 60 including the frame member 61 is inverted.

That is, it is preferable that a pressure-regulating device (not illustrated) for sucking air to lower the internal pressure of the mold 60 during the powder slush molding using the rotation of the mold 60 and blowing a predetermined amount of air into the molding resin 92 stored in the reservoir tank 88 before the powder slush molding is provided.

5. Mold Cooling Step

After that, a mold cooling step is a step (hereinafter, referred to as a mold cooling step) of cooling the mold 60, on which the sheet-like material 94 is formed in the mold cooling portion (C portion) illustrated in FIG. 1, to a predetermined temperature.

That is, the mold cooling step is a step of moving the mold 60 on which the sheet-like material 94 is molded to the mold cooling portion (C portion) from the powder slush portion (B portion) and cooling the mold 60 to a temperature of generally 40 to 50° C. by three steps using combinations of at least first air blow, mist/shower, and second air blow in the mold cooling portion (C portion).

Here, as partially described above, in the case of the powder slush molding machine 10a illustrated in FIG. 3, the powder slush portion (B portion) and the mold cooling portion (C portion) are integrated with each other (B/C portion) for a reduction in size, and the like. Accordingly, powder slush and the cooling of the mold are performed in the same portion.

That is, when the mold 60 is to be cooled, the powder box having been subjected to powder slush is moved to the box replacement position from the powder slush portion and the cooling device 55 provided in the mold cooling portion (mold replacement portion (D portion)) is moved to a position directly below the rotating device of the powder slush portion.

Then, it is preferable that the cooling device 55 is engaged with the frame member or the like gripping the mold 60 and showers cooling water or sprays cooling mist to the outer surface of the mold 60 in a state in which the inner surface of the mold 60 is exposed to the outside.

However, in a case in which takt time per sheet-like material is regarded as important, it is also preferable that the powder slush portion (B portion) and the mold cooling portion (C portion) are provided independently of each other as illustrated in the powder slush molding machine 10 of FIGS. 1 and 2 and powder slush molding and the cooling step are performed on different molds at the same time.

6. Separation Step

Finally, a separation step is a step (hereinafter, referred to as a separation step) of separating the formed sheet-like material from the mold in the mold working portion.

That is, separation step is a step of separating the sheet-like material 94, which is cooled to a temperature of about 40 to 60° C. by the cooling step, from the mold 60.

Meanwhile, the separation step may be automatically performed by a robot or the sheet-like material may be separated by human operations.

7. Operation Example 1

An operation example simultaneously using a plurality of molds, that is, a mold A (hereinafter, denoted by 60A), a mold B (hereinafter, denoted by 60B), and a mold C (hereinafter, denoted by 60C) as at least three molds when a series of predetermined processing relating to the powder slush molding is performed will be described with reference to FIGS. 3(a) and 3(b).

That is, predetermined processing is performed on the respective molds 60A to 60C at the same time and in parallel, so that takt time per sheet-like material 94 may be set to 150 sec or less and more preferably 120 sec or less, that is, may be set to be much shorter than takt time (for example, 240 sec) in the case of a device in the related art.

An operation example for shortening takt time by simultaneously using the three molds 60A to 60C will be described below with reference to the powder slush molding machine 10a illustrated in FIGS. 3(a) and 3(b).

First, the transport device 62 including the preheating device 63 clamps the mold 60A, is moved up to a predetermined place, and starts to preheat the mold 60A for a predetermined time by the preheating device 63.

After that, while preheating the mold 60A, the transport device 62 is moved down and is moved to the powder slush portion (B portion) from the mold working portion (E portion).

Next, the transport device 62 transports the mold 60B, which has been already subjected to powder slush molding/cooling processing, to the mold working portion (E portion) from the powder slush/cooling portion (B/C portion) and performs separating processing.

The transport device 62 transports the mold 60A to the mold heating portion (A portion) from the mold working portion (E portion) during the separating processing, and performs heating processing for a predetermined time.

Further, during the heating processing of the mold 60A, the transport device 62 clamps the mold C and starts to preheat the mold C.

then, after the transport device 62 takes the mold 60A out of the mold heating portion (A portion) and transports the mold 60A to the integrated portion (B/C portion) the powder slush and the cooling portion, powder slush molding/cooling processing are sequentially performed.

In this case, when the mold 60A is to be cooled, the powder box having been subjected to powder slush is moved to the box replacement position from the powder slush portion.

Further, the cooling device 55 provided in the mold cooling portion (mold replacement portion D portion) is moved to a position directly below the rotating device of the powder slush portion (B portion)/the mold cooling portion (C portion).

Furthermore, the cooling device 55 is engaged with the frame member gripping the mold 60A, and showers cooling water or sprays cooling mist to the outer surface of the mold 60A in a state in which the inner surface of the mold 60A is exposed to the outside.

Further, the transport device 62 clamps the mold 60C and preheats the mold 60C during the powder slush molding/cooling processing, and moves the mold 60C to the mold heating portion (A portion) to start heating processing.

That is, it is preferable that the transport device 62 is moved to the mold heating portion (A portion) from the integrated portion (B/C portion) including the powder slush portion and the cooling portion and transports the mold 60C to perform heating processing for a predetermined time.

Finally, the transport device 62 transports the mold 60A, which has been subjected to powder slush molding/cooling processing, to the mold working portion (E portion) from the integrated portion (B/C portion) including the powder slush portion and the cooling portion and performs separating processing.

According to Operation example 1, several kinds of independent processing including preheating processing may be performed at the same time and in parallel in a case in which the mold 60A, the mold 60B, and the mold 60C are used in the powder slush molding machine 10*a* illustrated in FIGS. 3(*a*) and 3(*b*) as described above.

Further, in the respective steps, there is a case where processing time may not necessarily be constant or a case where the several kinds of processing may not be physically performed at the same time. However, in such a case, the mold 60 may be preheated by the preheating device 63 provided in the transport device 62 while standing by a predetermined place, for example, above a heating furnace 58'.

Moreover, the powder slush molding machine 10 in which the mold heating portion (A portion), the powder slush/cooling portion (B/C portion), the mold replacement portion (D portion), and the mold working portion (E portion) are arranged in this order from the right has been assumed in the case of Operation example 1. However, a powder slush molding machine 10 in which the mold heating portion (A portion), the mold replacement portion (D portion), the powder slush/cooling portion (B/C portion)), and the mold working portion (E portion) are arranged in this order from the left may be assumed.

8. Operation Example 2

Various kinds of predetermined processing have been described in Operation example 1 on the premise of the presence of the powder slush molding machine 10*a* in which powder slush molding/cooling processing are performed by the integrated portion (B/C portion) as illustrated in FIGS. 3(*a*) and 3(*b*).

In contrast, the powder slush molding machine 10 illustrated in FIGS. 1 and 2, that is, the powder slush molding machine 10 in which the powder slush portion (B portion) and the mold cooling portion (C portion) are provided independently of each other and powder slush molding and cooling processing are separately performed in separate portions, respectively, is assumed and various kinds of predetermined processing may be described in Operation example 2.

That is, in Operation example 2, for example, powder slush molding is performed for a predetermined time after the mold 60A is taken out of the mold heating portion (A portion) and is transported to the powder slush portion (B portion) by the transport device 62.

Further, in Operation example 2, for example, other processing may be performed on another mold 60B while powder slush molding is performed on the mold 60A for a predetermined time in the powder slush portion (B portion).

For example, while powder slush molding is performed on the mold 60A, the mold 60B (having been subjected to powder slush processing) is moved to the mold cooling portion (C portion) by the transport device 62 and cooling processing may be performed in the mold cooling portion (C portion) at the same time.

On the other hand, in Operation example 2, as steps separate from the processing, for example, the mold 60A is moved to the mold cooling portion (C portion) by the transport device 62 and cooling processing may also be performed in the mold cooling portion (C portion) after powder slush molding is performed on the mold 60A for a predetermined time in the powder slush portion (B portion).

Accordingly, waiting time for the next step, which is required when powder slush molding is performed on the mold 60A, or time required for the movement of the cooling device to the powder slush portion (B portion) may be omitted in Operation example 2 in comparison with processing time in Operation example 1 that is made on the premise of the machine in which powder slush molding/cooling processing are performed by the integrated portion (B/C portion).

Accordingly, one sheet-like material may be molded in a takt time of 100 sec or less and more preferably 80 sec or less.

Meanwhile, Operation example 2 is the same as Operation example 1 in that a transport device with a preheating device is used or a plurality of molds may be simultaneously transported by one transport device.

EXAMPLES

Example 1

1. Production of Sheet-Like Material
(1) Mold Preparation Step

A predetermined mold (a nickel electroforming mold having a thickness of 3.5 mm) was prepared in the mold working portion (E portion) illustrated in FIG. 1.

(2) Preheating Step

Next, the predetermined mold was moved to the mold heating portion (A portion) from the mold working portion (E portion) illustrated in FIG. 1 by a crane as a transport device.

In this case, far-infrared ceramic heaters were started in synchronization with the gripping of the mold performed by the crane to preheat the mold for about 30 sec so that the temperature of the outer surface of the mold reaches, for example, 180° C.

(3) Heating Step

Next, the mold, which was preheated to about 160° C. during the transport of the mold by a preheating device mounted on the crane, was received in the main heating furnace (the amount of heat supplied per unit time: 300,000 kcal/hr) of which temperature was maintained at about 430° C., and the mold was heated for 35 sec under a predetermined flow rate condition so that the average surface temperature of the mold (a temperature difference between the A surface and the B surface was within 8° C.) was about 260° C. as a target.

Meanwhile, the temperature of the surface (the A surface and the B surface) of the mold as the temperature of the mold may be directly measured by the non-contact infrared thermometer, the thermography thermometer, or the contact thermocouple having been described above.

Alternatively, the temperature of the outer surface of the mold is measured by the non-contact infrared thermometer or the like, and the temperature of the inner surface may also be estimated from the measured temperature in consideration of the material, the thickness, and the like of the mold, that is, the temperature of the inner surface may also be indirectly measured.

(4) Powder Slush Step

After that, as illustrated in FIG. 1, the mold was moved to the powder slush portion (B portion) from the mold heating portion (A portion) by the crane.

Next, powder slush molding was performed on the mold, which was heated to about 260° C., for 30 sec using a molding resin (average particle size: 30 μm powder) formed of a heat-resistant vinyl chloride resin by the powder slush molding machine to obtain a sheet-like material having a thickness of about 1.3 mm.

Further, preheating for maintaining the temperature of the mold at a predetermined temperature (about 130° C.) was performed by the preheating device mounted on the crane for 15 sec while the mold is moved to the powder slush/cooling portion (B/C portion) from the mold heating portion (A portion). As a result, it was confirmed by the infrared thermometer that the temperature of the mold was hardly lowered (less than 5° C.).

In contrast, in a case in which a crane in the related art not provided with a preheating device was used, it was separately found that the temperature of the mold was lowered by a temperature of about 10 to 30° C. and affected powder slush molding while the mold was moved to the powder slush portion (B portion) from the mold heating portion (A portion).

(5) Cooling Step

After that, while the mold including the sheet-like material was held in the powder slush portion (B portion) by the crane as illustrated in FIG. 1, the powder box having been subjected to powder slush was moved to the box replacement position from the powder slush portion and the cooling device provided in the mold replacement portion (D portion) was moved to a position directly below the rotating device of the powder slush portion.

Next, the cooling device was engaged with the frame member gripping the mold, and cooling water was showered or cooling mist was sprayed to the outer surface from the lower side of the mold in a state in which the mold on which the sheet-like material was formed substantially faced up and the inner surface of the mold was exposed to the outside.

That is, it was confirmed that the temperature of the surface of the sheet-like material was lowered to about 100° C. by the spray of first air (dry air) to the outer surface of the mold for about 20 sec.

After that, it was confirmed that the temperature of the surface of the sheet-like material was lowered to about 55° C. from about 100° C. by the mist/shower-cooling of the outer surface of the mold performed for about 15 sec.

In addition, it was confirmed that second air (dry air) was sprayed for about 5 sec to scatter water droplets adhering to the surface of the sheet-like material and the temperature of the mold was lowered to about 50° C. from about 55° C.

(6) Separation Step

Next, after the mold including the sheet-like material was moved to the mold working portion (E portion) from the mold cooling portion (C portion) by the crane as illustrated in FIG. 1, the sheet-like material of which temperature was lowered to about 50° C. was separated by human operations to form a sheet-like material of Example 1.

2. Evaluation of Sheet-Like Material

The thicknesses of ten arbitrary portions of the obtained sheet-like material were measured by a vernier caliper, and a thickness forming property was evaluated from the average thickness thereof on the basis of following criteria.

As a result, the average thickness was 1.4 mm and the variation (a difference between the maximum value and the minimum value) of the thickness of the sheet-like material was less than 80 μm.

Further, the manufacture of a sheet-like material was repeated under the same condition by the powder slush molding machine illustrated in FIG. 1. As a result, it was confirmed that a gross phenomenon (a baking phenomenon) did not occur and a crack was not generated in the mold even though the sheet-like material was used 10000 times or more.

Comparative Example 1

A sheet-like material was produced and evaluated in Comparative example 1 in the same manner as Example 1 except that the surface of the mold is not preheated at all by the preheating device mounted on the crane.

The thicknesses of ten arbitrary portions of the obtained sheet-like material were measured by a vernier caliper, and a thickness forming property was evaluated from the average thickness thereof on the basis of following criteria. As a result, the average thickness was 1.2 mm and the variation (a difference between the maximum value and the minimum value) of the thickness was 1600 μm or more.

Further, the manufacture of a sheet-like material was repeated under the same condition by the powder slush molding machine illustrated in FIG. 1. As a result, it was confirmed that a gross phenomenon (a baking phenomenon) occurred or a crack was generated in the mold when the sheet-like material was used less than 100 times.

INDUSTRIAL APPLICABILITY

According to a powder slush molding machine and a powder slush molding method of the invention, a preheating device for heating a mold, which is being transported, is provided at a part of a transport device in addition to an original heating furnace for mainly heating the inner surface of a mold. Accordingly, time required to heat the mold to a predetermined temperature might be significantly shortened and uniformized in a main heating furnace.

Further, with the shortening and the like of the heating of the mold, takt time for the molding of a sheet-like material might be shortened to a value of 120 sec or less in the case of so-called three molds and might be shortened to a value of 80 sec or less in the case of so-called four molds.

Furthermore, the mold might also be partially heated or might also be heated with a temperature difference by the preheating of the mold. Accordingly, temperature distribution in the mold was also narrowed. Particularly, since the mold might be uniformly and partially heated at the most deep inner surface position 60c of the mold 60 as illustrated in FIG. 9(a), the occurrence of metal fatigue (the generation of a crack) might be effectively prevented.

Accordingly, it is expected that a sheet-like material 94 as an obtained powder slush molding is suitably used as an interior material, a bumper, and the like of an automobile.

EXPLANATIONS OF LETTERS OR NUMERALS 10, 10a: powder slush molding machine
14: hot air 16: hot air outlet
40: hot air generating unit
41: branch pipe
43: main pipe
48: damper
49: baffle plate
54: energy recovery unit
55: cooling device
58, 58': heating furnace
58a: shutter
58b: weight
58c: heating device
58d: recovery device
58e: stirring device
58f: outlet
60, 60', 60A, 60B, 60C: mold
60', 60": replacement mold
61: frame member for mold
61a', 61a": frame member for replacement mold
62: transport device (crane)
62c: hook
63: preheating device
63a: far-infrared heating heater (ceramic heater)
63b: power source/motors
63c: frame member
63d: cover member
64: powder box
84a, 84b: formwork
88: reservoir tank
88a: stirring chamber
92: second resin (molding resin)
94: sheet-like material
98: shower nozzle/mist nozzle
99: drying device
99a, 99a': outlet
99b: air blower
100, 100': heating device

The invention claimed is:

1. A powder slush molding machine comprising:
a mold heating portion that performs a main heating to heat a mold so that the temperature of the mold is set to a value equal to or higher than a predetermined temperature;
a powder slush portion that sprays a molding resin, while powdering the molding resin, to mold a sheet-like material having a predetermined thickness on the inner surface of the heated mold;
a mold cooling portion that cools the mold so that the temperature of the mold is equal to or lower than a predetermined temperature;
a mold working portion that separates the cooled sheet-like material from the mold; and
a transport device that grips and moves the mold between the mold heating portion, the powder slush portion, the mold cooling portion and the mold working portion,
wherein the transport device comprises a preheating device that is a far-infrared heater configured to preheat at least the outer surface of the mold while gripping and moving the mold.

2. The powder slush molding machine according to claim 1,
wherein the preheating device includes a cover member that includes an opening opening downward and receives the mold through the opening.

3. The powder slush molding machine according to claim 1,
wherein the transport device includes a synchronization mechanism that switches on the preheating device to preheat the mold when the transport device grips the mold.

4. The powder slush molding machine according to claim 1,
wherein the powder slush portion and the mold cooling portion are integrated with each other, and an exchange device, which is capable of exchanging the position of a powder box of the powder slush portion with the position of a cooling device of the mold cooling portion, is provided between the powder slush portion and the mold cooling portion.

* * * * *